US012149615B2

United States Patent
Kirsanov et al.

(10) Patent No.: US 12,149,615 B2
(45) Date of Patent: Nov. 19, 2024

(54) LONG-DISTANCE QUANTUM KEY DISTRIBUTION

(71) Applicant: Terra Quantum AG, St. Gallen (CH)

(72) Inventors: Nikita Kirsanov, St. Gallen (CH);
Nurbolat Kenbayev, St. Gallen (CH);
Dmitry Kronberg, St. Gallen (CH);
Valerii Vinokour, St. Gallen (CH);
Gordey Lesovik, St. Gallen (CH);
Pavel Sekatski, St. Gallen (CH); Asel Sagingalieva, St. Gallen (CH)

(73) Assignee: Terra Quantum AG, Rorschach (CH)

( * ) Notice: Subject to any disclaimer, the term of this patent is extended or adjusted under 35 U.S.C. 154(b) by 454 days.

(21) Appl. No.: 17/675,256

(22) Filed: Feb. 18, 2022

(65) Prior Publication Data

US 2022/0278834 A1     Sep. 1, 2022

(30) Foreign Application Priority Data

Feb. 18, 2021  (EP) .................................... 21157942
Mar. 31, 2021  (EP) .................................... 21166427

(51) Int. Cl.
*H04L 9/08*    (2006.01)
*G06N 10/20*   (2022.01)

(52) U.S. Cl.
CPC .......... *H04L 9/0858* (2013.01); *G06N 10/20* (2022.01); *H04L 9/0838* (2013.01)

(58) Field of Classification Search
CPC ... H04L 9/0858; H04L 9/0838; H04L 9/0855; H04L 9/0852; H04L 1/0013;

(Continued)

(56) References Cited

U.S. PATENT DOCUMENTS 5,515,438 A  *  5/1996  Bennett .................. H04L 9/0858
                                                          380/278
7,333,611 B1 *  2/2008  Yuen ...................... H04B 10/70
                                                          380/256

(Continued)

FOREIGN PATENT DOCUMENTS

CN      108768542 A      11/2018
CN      109194468 A       1/2019

OTHER PUBLICATIONS

European Patent Office, Extended European Search Report in European Patent Application No. 21157942.0 (Jul. 26, 2021).

(Continued)

*Primary Examiner* — Matthew Smithers
(74) *Attorney, Agent, or Firm* — Leydig Voit & Mayer, Ltd.

(57) ABSTRACT

A system and method for determining a secret cryptographic key shared between a sending unit and a receiving unit by using a communication channel comprising spatially separated amplifiers for secure long-distance communication includes transmitting a sequence of electromagnetic pulses via the communication channel through the amplifiers for establishing a shared secret cryptographic key, wherein each electromagnetic pulse corresponds to a bit of a random bit sequence according to a ciphering protocol, and at least one ciphering parameter is determined by maximizing the expected key generation rate using an information theory model, wherein a measured signal loss and at least one amplification parameter are taken into account as input parameters to the information theory model.

15 Claims, 5 Drawing Sheets

(58) Field of Classification Search
CPC ....... H04L 1/0057; H04L 9/3236; H04L 9/08; H04L 9/0816; G06N 10/20
See application file for complete search history.

(56) References Cited

U.S. PATENT DOCUMENTS

| | | | | |
|---|---|---|---|---|
| 7,831,050 | B2* | 11/2010 | Barbosa | H04L 9/0858 380/278 |
| 9,160,529 | B2* | 10/2015 | Tajima | H04L 9/0858 |
| 9,306,739 | B1* | 4/2016 | Troupe | H04L 9/0858 |
| 10,313,113 | B2* | 6/2019 | Frohlich | H04B 10/70 |
| 10,951,324 | B2* | 3/2021 | Lucamarini | H04B 10/54 |
| 11,212,086 | B2* | 12/2021 | Rhee | H04L 9/0858 |
| 2004/0109564 | A1* | 6/2004 | Cerf | H04L 9/0858 380/256 |
| 2012/0177365 | A1* | 7/2012 | Winzer | H04B 10/60 398/44 |
| 2014/0099104 | A1* | 4/2014 | Peters | H04B 10/2507 398/25 |
| 2020/0099520 | A1* | 3/2020 | Legré | H04L 9/0827 |
| 2022/0109565 | A1* | 4/2022 | Lesovik | H04L 9/0838 |

OTHER PUBLICATIONS

European Patent Office, Extended European Search Report in European Patent Application No. 21166427.1 (Sep. 22, 2021).

* cited by examiner

LONG-DISTANCE QUANTUM KEY DISTRIBUTION

CROSS-REFERENCE TO RELATED APPLICATIONS

This patent application is claims priority to European Patent Application Nos. 21157942.0, filed on Feb. 18, 2021, and 21166427.1, filed on Mar. 31, 2021, which are incorporated herein in their entirety by this reference.

FILED OF THE DISCLOSURE

The present disclosure relates to a method and communication apparatus for determining a secret cryptographic key shared between a sending unit and a receiving unit for secure long-distance communication.

BACKGROUND OF THE INVENTION

Quantum key distribution is a core element of communication protocols employing quantum resources for achieving fast and secure communications. The security of quantum key distribution relies on a reliable control of photon quantum state transmission along a quantum communication channel extending from a sending unit (conventionally called Alice) to a receiving unit (conventionally called Bob).

Quantum key distribution over long distances has been demonstrated by employing a variety of single photon sources, but typically suffers from low key exchange rates, detrimental effects due to intrinsic loss and de-coherence at the sending unit, receiving unit or along the communication channel, as well as vulnerabilities with respect to various carefully designed attack schemes (eavesdropping by a malicious third party, conventionally called Eve).

BRIEF SUMMARY OF THE INVENTION

Embodiments of the present disclosure overcome limitations of the prior art and provide a simple and practical method and communication apparatus for determining and distributing a secret cryptographic key enabling secure communications with a high key exchange rate, in particular over long distances.

In certain embodiments, this objective is achieved by the method, communication apparatus, computer readable storage medium and computer program product as described in the claims. Advantageous developments and embodiments are described in the dependent claims and in the discussion that follows below.

The disclosure relates to a method for determining a secret cryptographic key shared between a sending unit and a receiving unit by using a communication channel comprising spatially separated amplifiers for secure long-distance communication.

BRIEF DESCRIPTION OF THE SEVERAL VIEWS OF THE DRAWING(S)

FIG. 1 is a schematic illustration of a communication setup according to an embodiment of the present disclosure.

FIG. 2 schematically illustrates how several loss or amplification channels may be reduced to one pair of loss and amplification channels, in a communication setup according to an embodiment of the present disclosure.

FIG. 3 schematically illustrates optical phase diagrams of quantum states in a communication setup according to an embodiment of the present disclosure.

FIG. 4 is a schematic illustration of quantum measurements employed by Bob in a communication setup according to an embodiment of the present disclosure.

FIG. 5 schematically illustrates a beam splitter attack employed by Eve on a communication protocol according to an embodiment of the present disclosure.

DETAILED DESCRIPTION OF THE INVENTION

Figure 1:
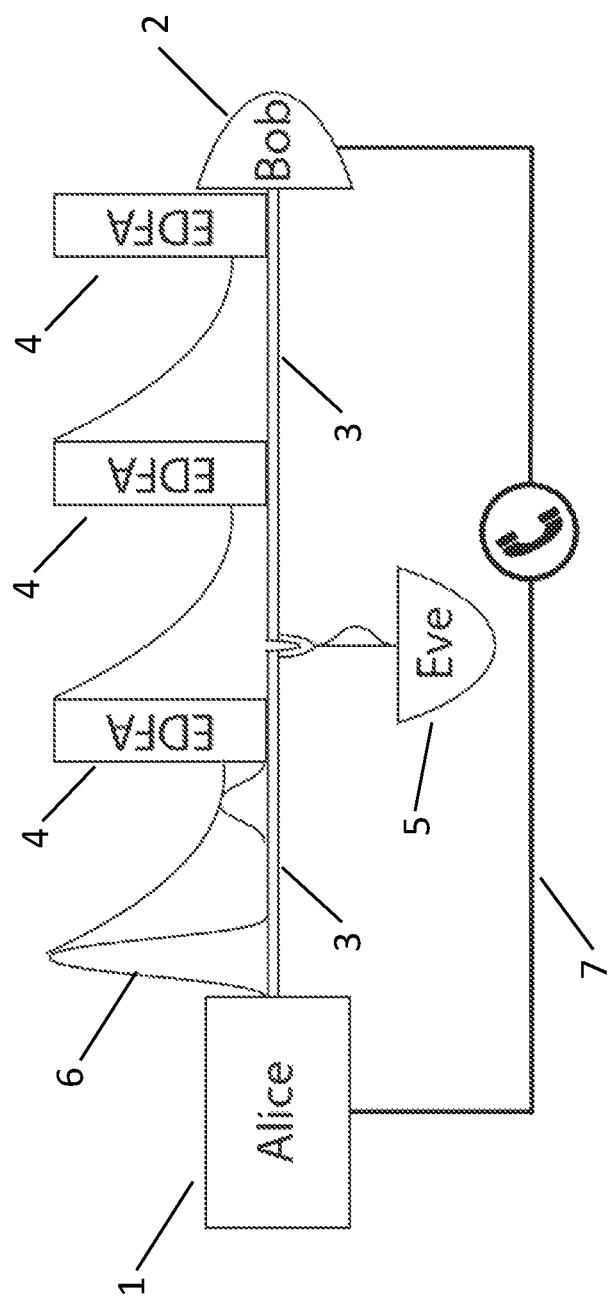

A system and method in accordance with the present disclosure comprises transmitting, at the sending unit, at least one electromagnetic test pulse to the receiving unit via the communication channel, and determining a signal loss $r_E$ in the communication channel caused by an eavesdropper based on the at least one electromagnetic test pulse detected at the receiving unit.

The method further comprises transmitting, at the sending unit, a first sequence of electromagnetic pulses to the receiving unit via the communication channel through the spatially separated amplifiers, for establishing a shared secret cryptographic key.

Each electromagnetic pulse of the first sequence of electromagnetic pulses corresponds to a bit of a random bit sequence according to a ciphering protocol. At least one ciphering parameter of the ciphering protocol is determined by maximizing the expected key generation rate ($L_f/L$) with respect to the at least one ciphering parameter using an information theory model for the expected key generation rate ($L_f/L$). The determined signal loss $r_E$ and at least one amplification parameter of the spatially separated amplifiers are taken into account as input parameters to the information theory model. With the proposed method, secure and robust (quantum) key distribution with a high key generation (or exchange) rate ($L_f/L$) can be achieved. Here and in the following, the key generation rate $L_f/L$ may be given in dimensionless units, where L is the length of the random bit sequence (random number generation rate in units of time), and $L_f$ is the length of the (to-be-determined) secret shared cryptographic key (final key generation rate in units of time). The ratio $L_f/L$ may also be referred to as the informational advantage or the normalized key generation rate.

The determining of the signal loss $r_E$ in the communication channel caused by an eavesdropper allows monitoring of the eavesdropper activity and enables physical control of the communication channel. In particular, by determining the at least one ciphering parameter through maximization based on the information theory model, the ciphering protocol may be optimized and/or adapted based on the determined signal loss $r_E$ in order to ensure a maximal key exchange rate even in the presence of an eavesdropper (malicious third party).

The signal loss $r_E$ in the communication channel caused by an eavesdropper may be determined based on standard telecom technology. More specifically, a total signal loss may be determined by comparing the at least one electromagnetic test pulse detected at the receiving unit with the at least one electromagnetic test pulse transmitted by the sending unit (e.g., via an authenticated public classical channel).

An intrinsic loss of the communication channel may be known or pre-determined, e.g., through measurement or simulation.

Optionally, the communication channel may be configured such that the intrinsic loss is (pre-dominantly) caused by Rayleigh scattering. The signal loss $r_E$ caused by an eavesdropper may be determined from the total signal loss and the intrinsic loss of the communication channel.

The at least one electromagnetic test pulse may comprise a sequence of electromagnetic test pulses. Advantageously, the at least one electromagnetic test pulse and/or each pulse of the sequence of electromagnetic test pulses may be randomized with respect to its pulse intensity, pulse phase, pulse length and/or pulse shape.

Optionally, the pulse intensity (or average number of photons) of the at least one electromagnetic test pulse is larger than the pulse intensity (or average number of photons) of each electromagnetic pulse of the first sequence.

Optionally, the pulse duration of the at least one electromagnetic test pulse is larger than the pulse duration of an electromagnetic pulse of the first sequence. All electromagnetic pulses of the first sequence may share a same pulse duration. The constant or average power of the at least one electromagnetic test pulse may (approximately) be equal to the constant or average power of an electromagnetic pulse of the first sequence.

The ciphering protocol may comprise an assignment rule according to which each electromagnetic pulse of the first sequence of electromagnetic pulses may be assigned to a bit with a bit value 0 or 1 (binary encoding scheme). Preferably, electromagnetic pulses of the first sequence that correspond to different bits are (substantially) non-orthogonal. Advantageously, the average number of photons comprised in each electromagnetic pulse of the first sequence is larger than 1.

The ciphering mode of the ciphering protocol may correspond to a phase ciphering or an intensity ciphering. Optionally, the ciphering protocol either corresponds to phase ciphering, wherein the phases of the electromagnetic pulses of the first sequence are modulated according to the random bit sequence, or to intensity ciphering, wherein the intensities of the electromagnetic pulses of the first sequence are modulated according to the random bit sequence. Other ciphering modes are possible as well, and different ciphering modes may also be employed in combination.

If phase ciphering is the ciphering mode of the ciphering protocol, bits are encoded into electromagnetic pulses with different phases.

For example, an electromagnetic pulse of the first sequence of electromagnetic pulses with a first phase may be assigned to a bit value 0, and an electromagnetic pulse of the first sequence of electromagnetic pulses with a second phase may be assigned to a bit value 1, wherein the first phase may be different from the second phase.

The (phase) difference between the first phase and the second phase may be $\pi$.

The electromagnetic pulses of the first sequence of electromagnetic pulses may be coherent electromagnetic pulses with a same pulse intensity. Advantageously, in case the length of the communication channel and/or the distance between two amplifiers allows for the preservation of coherence, phase ciphering may enable a lower error rate, thus ensuring a particular fast transmission of information along the communication channel.

If intensity ciphering is the ciphering mode of the ciphering protocol, bits are encoded into electromagnetic pulses with different pulse intensities.

For example, an electromagnetic pulse of the first sequence of electromagnetic pulses with a first intensity may be assigned to a bit value 0, and an electromagnetic pulse of the first sequence of electromagnetic pulses with a second intensity may be assigned to a bit value 1, wherein the first intensity may be different from the second intensity.

The difference between the first intensity and the second intensity may be predetermined.

The electromagnetic pulses of the first sequence of electromagnetic pulses may be coherent electromagnetic pulses with the same phase. Intensity ciphering does not rely on polarization preservation and may thus be advantageous in case of long-distance communications. Moreover, in case of intensity ciphering the measurement routine at the receiving unit may be simplified and/or may be based on intensity detection. The at least one ciphering parameter that is determined through optimization/maximization based on the information theory model may correspond to an intensity of the coherent electromagnetic pulses of the first sequence, and/or may correspond to the absolute value $\gamma$ of the coherent state amplitude of the coherent electromagnetic pulses of the first sequence.

In case of intensity ciphering, the at least one ciphering parameter may also comprise the first intensity, the second intensity and/or the difference between the first intensity and the second intensity.

The amplification of the transmitted first sequence of electromagnetic pulses along the communication channel makes it possible to at least partially compensate for the intrinsic loss and/or the signal loss $r_E$ caused by an eavesdropper. Optionally, the plurality of amplifiers may be configured to only compensate for the intrinsic loss of the communication channel. Thereby, the pulse intensities of the first sequence of electromagnetic pulses may be preserved over long distances, thereby enabling secure long-distance (quantum) key distribution.

The plurality of spatially separated amplifiers may be arranged in-line and/or equidistantly along the communication channel.

Optionally, the spatially separated amplifiers correspond to or comprise optical amplifiers. Advantageously, the optical amplifiers may be coherence-preserving optical amplifiers. Optionally, the spatially separated amplifiers correspond to or comprise in-line Erbium doped fiber amplifiers (EDFA) and/or Raman amplifiers. Additionally or alternatively, other type of amplifiers may also be employed.

The at least one amplification parameter of the spatially separated amplifiers that is used as input parameter to the information theory model may comprise a number of spatially separated amplifiers M, and/or a distance d between two neighbouring amplifiers, and/or an amplification factor G. The number of spatially separated amplifiers may be larger than 2 (M>2).

The transmitted first sequence of the electromagnetic pulses may be received and/or measured by the receiving unit using intensity detection or homodyne detection. Intensity detection may be used in case of intensity ciphering. In some embodiments, homodyne detection may be used in case of phase ciphering. Optionally, a quadrature of the transmitted and received electromagnetic pulses of the first sequence may be determined at the receiving unit using homodyne detection or intensity detection. The received electromagnetic pulses of the first sequence may be deciphered at the receiving unit according to the ciphering protocol by using the results of the homodyne detection or intensity detection. The ciphering protocol may be communicated between the sending unit and the receiving unit using an authenticated public classical communication channel.

According to the deciphering procedure, a received electromagnetic pulse of the first sequence may be identified with a bit value 0 or 1, depending on the quadrature value of the received electromagnetic pulse measured using homodyne detection or intensity detection. More specifically, the corresponding (deciphered) bit values may be determined by evaluating quantum mechanical expectation values of two measurement operators corresponding to bit values 0 and 1 with respect to each received electromagnetic pulse of the first sequence, in particular two measurement operators of a positive operator-valued measure (POVM) corresponding to the bit values 0 and 1.

The method may further comprise a step of performing post-selection. Post-selection may be carried out at the receiving unit based on homodyne detection or intensity detection of the transmitted and received first sequence of electromagnetic pulses. More specifically, post-selection may be based on a selection criterion. According to the selection criterion, bits corresponding to electromagnetic pulses of the transmitted and received first sequence with a quadrature component q not exceeding a minimal absolute value $\Theta$ may be discarded as inconclusive. The positions of the discarded bits in the bit sequence obtained from deciphering the first sequence of transmitted and received electromagnetic pulses may be communicated to the sending unit via an authenticated public classical channel in order to establish a shared bit sequence. In particular, the remaining (not discarded) bits may represent a bit sequence shared between the sending unit and the receiving unit.

Preferably, the minimal absolute value $\Theta$ used for post-selection is determined according to the signal loss $r_E$.

More specifically, the minimal absolute value $\Theta$ may be determined and chosen for post-selection based on the information theory model by maximizing the expected key generation rate ($L_f/L$) with respect to the at least one ciphering parameter and/or with respect to the minimal absolute value $\Theta$. In this case, optionally the at least one ciphering parameter of the ciphering protocol and the minimal absolute value ($\Theta$) for post-selection may both be determined (e.g., simultaneously) by maximizing the expected key generation rate ($L_f/L$) based on the information theory model.

The shared bit sequence obtained from post-selection may be used to establish a secret shared cryptographic key for secure long-distance communications between the sending unit and the receiving unit. Optionally, before establishing a secret shared cryptographic key the shared bit sequence may be subject to error correction and/or privacy amplification as described further below.

The method may further comprise a step of performing error correction. The step of performing error correction may be carried out after the step of performing post selection.

Parity bits may be part of the random bit sequence and/or may be part of the shared bit sequence obtained after post selection. Optionally, electromagnetic pulses corresponding to parity bits may be transmitted as part of the first sequence of electromagnetic pulses. A parity bit may be assigned to a block (subset) of the random bit sequence.

The step of performing error correction may comprise estimating an error rate of deciphering at the receiving unit for at least a part of the transmitted first sequence of electromagnetic pulses. The error of deciphering may be estimated using Bayes' theorem.

More specifically, a conditional probability of a codeword given a result of deciphering at the receiving unit may be estimated based on the quadrature of transmitted electromagnetic pulses measured using homodyne detection or intensity detection in order to estimate the error of deciphering.

Additionally or alternatively, a conditional probability of a codeword given a result of deciphering at the receiving unit may be estimated based on the minimal absolute value $\Theta$ in order to estimate the error of deciphering.

The error of deciphering may also be estimated by disclosing deciphered bits obtained at the receiving unit from at least a part of the transmitted first sequence of electromagnetic pulses. Disclosed deciphered bits used to determine the error of deciphering may correspond to parity bits.

More specifically, the error of deciphering may be estimated by comparing deciphered bits obtained from at least a part of the transmitted first sequence of electromagnetic pulses with the random bit sequence obtained or generated at the sending unit, e.g., by using an authenticated public classical channel. In this way, the error of deciphering may be observed directly by (publicly) disclosing a part of the shared bit sequence and/or the parity bits obtained after post selection.

The (publicly) disclosed part of the shared bit sequence may be discarded and the remaining bits of the shared bit sequence may be used to establish the secret shared cryptographic key. The error of deciphering for the remaining part of the shared bit sequence may then be estimated using Bayes' theorem.

Additionally or alternatively, a first error information may be obtained from first parity bits of a first subset of the first sequence of electromagnetic pulses or parts thereof. A second error information may be obtained from second parity bits of a second subset of the received first sequence of electromagnetic pulses or parts thereof. The error of deciphering may be estimated by comparing the first parity bits and the second parity bits and by using Bayes' theorem.

An error correction code may be a linear block code. Optionally, the error correction code may be a low-density parity-check code (LDPC). The estimate of the error of deciphering may be used as an input to the error correcting code. Optionally, a block size and/or a code rate of the error correction code is determined and/or adapted based on the estimated error rate of deciphering. Optionally, the step of error correction may comprise error correcting the post-selected bits obtained from deciphering of at least a part of the transmitted and detected first sequence of electromagnetic pulses.

The method may further comprise a step of performing privacy amplification in order to eliminate or limit information about the shared bit sequence obtained by the eavesdropper.

More specifically, privacy amplification may be used to at least partially eradicate the information of an eavesdropper about bits obtained from the transmitted and detected first sequence of electromagnetic pulses and/or the bit sequence shared between the sending unit and the receiving unit after deciphering, post-selection and/or error correction. The step of privacy amplification may comprise distilling from the shared bit sequence a secret shared cryptographic key by using a hash function as a map.

Optionally, the aforementioned steps of the method may be carried out iteratively and/or consecutively. The shared bit sequences obtained after each iteration of the aforementioned steps of the method may be combined and/or appended in order to establish a secret shared cryptographic key of a desired or pre-determined length. The secret shared cryptographic key may be used for secure long-distance communications between the sending unit and the receiving unit.

In each iteration, a different first sequence of electromagnetic pulses or a different subset of the first sequence of electromagnetic pulses may be transmitted from the sending unit to the receiving unit. In each iteration, the steps of post-selection, error-correction and/or privacy amplification as described further above may be carried out for a different first sequence of electromagnetic pulses or a different subset of the first sequence of electromagnetic pulses.

Optionally, a second subset of the first sequence of electromagnetic pulses or another first sequence of electromagnetic pulses may be transmitted from the sending unit to the receiving unit after the transmission of a first subset of the first sequence of electromagnetic pulses or the first sequence of electromagnetic pulses. Optionally, error correction may be carried out adaptively. In a first iteration, a first estimate of the error of deciphering may be obtained from a first subset of the received first sequence of electromagnetic pulses. Error correction for the first subset of the received first sequence of electromagnetic pulses may be carried out according to a first error correction code.

In a second iteration carried out after the first iteration, the first estimate of the error of deciphering and/or the error observed after the first iteration may be used as an input to the error estimation for the second error correction code. The second error correction code may be used to error correct a second subset of the received first sequence of electromagnetic pulses or another first sequence of electromagnetic pulses etc.

Consequently, the efficiency of error correction and/or the estimate of the error of deciphering can be updated and improved after each iteration. More specifically, error correction may be carried out adaptively by adapting the block size and/or the code rate of the error correction code according to the error of deciphering estimated in each iteration. The adaption may be carried out based on Bayes' theorem.

The information theory model for the expected key generation rate ($L_s/L$) may be based on quantum mechanical principles. More specifically, the information theory model may describe an incoherent evolution of a density matrix in the basis of the sending unit, the receiving unit and the eavesdropper. The density matrix may correspond to a state of photons comprised in the first sequence of electromagnetic pulses.

According to the information theory model, the density matrix may evolve from an initial density matrix to a final density matrix. An initial density matrix may describe the state of photons comprised in the first sequence of electromagnetic pulses before transmitting the first sequence of electromagnetic pulses to the receiving unit. Optionally, the initial density matrix may correspond to a mixture (or quasi-mixture) of coherent states and/or vacuum states. The final density matrix may correspond to the state of photons comprised in the first sequence of electromagnetic pulses after the transmitting of the first sequence of electromagnetic pulses from the sending unit to the receiving unit, post-selection, error correction and/or privacy amplification.

The information theory model may comprise canonical transformations of the density matrix in order to account for the effects of loss and amplification in or along the communication channel. A canonical transformation describing loss and/or amplification may correspond to an incoherent evolution of the density matrix. Optionally, a canonical transformation may comprise a loss factor (T) and/or an amplification factor (G) as an input parameter to the information theory model.

Optionally, the loss factor (T) and/or amplification factor (G) comprises a distance (d) between two neighbouring amplifiers, a distance ($D_{AB}$) between the sending unit and the receiving unit, and/or a distance ($D_{AE}$) between the sending unit and the eavesdropper.

Any of the aforementioned parameters may constitute an input parameter to the information theory model. Additionally or alternatively, any of the aforementioned parameters may constitute an optimization parameter determined through maximization of the expected key generation rate ($L_s/L$) based on the information theory model and used as an optimized device parameter of the communication apparatus. In this way, the communication apparatus may be configured based on the information theory model.

Advantageously, a canonical transformation describing loss and/or amplification may be based on a Hamiltonian. The Hamiltonian may describe light-matter interactions between an amplifying medium of the spatially separated amplifier (matter) and photons comprised in the first sequence of electromagnetic pulses (light) with a light-matter interaction strength ($\lambda$). Optionally, the loss factor (T) and/or the amplification factor (G) may comprise the light-matter interaction strength ($\lambda$).

Advantageously, effects of amplifier noise (e.g., quantum noise) and/or detrimental effects of amplification may be taken into account in the information theory model based on the Hamiltonian. Optionally, detrimental effects of amplification may include an incomplete inversion of the atomic population of the amplifying medium and/or coupling imperfections between a mode of the communication channel and an amplifier.

Since the at least one ciphering parameter of the ciphering protocol is determined through optimization based on the information theory model, the at least one ciphering parameter and/or the ciphering protocol may depend on all or any one of the input parameters to the information theory model. More specifically, the at least one ciphering parameter and/or the ciphering protocol may be determined by all or any one of the input parameters using the optimization procedure based on the information theory model.

Thus, the at least one ciphering parameter and the ciphering protocol may also be optimized with respect to loss and amplification, thereby enabling a realistic account of the hardware constraints set by the communication channel, the plurality of amplifiers and/or the presence of an eavesdropper.

The information theory model may comprise a beam splitter model in order to take into account the effect of an eavesdropper trying to seize a part of the signal (beam splitter attack).

The signal may correspond to the first sequence of electromagnetic pulses.

The beam splitter may comprise an input, a first output and a second output. The input may correspond to the transmitted first sequence of electromagnetic pulses, wherein the transmitted first sequence of electromagnetic pulses may have been propagated along at least a part of the communication channel and/or may have been subject to loss and amplification.

The first output may correspond to a part of the transmitted first sequence of electromagnetic pulses seized by the eavesdropper.

The second output may correspond to a part of the transmitted first sequence of electromagnetic pulses that propagate further along the communication channel to the receiving unit.

The first output and the second output may be quantum entangled.

The intensities and/or the coherent state amplitudes of the first and second output may depend on the determined signal loss ($r_E$) caused by an eavesdropper. In this way, the signal loss ($r_E$) may be introduced into the information theory model as an input parameter.

The information theory model may optimize and/or account for the steps of post-selection, error-correction and/or privacy-amplification through probabilistic models. More specifically, the mutual information shared between the sending unit and an eavesdropper, and/or the mutual information between the sending unit and the receiving unit may be estimated and/or optimized before and/or after a step of post-selection, error-correction and/or privacy amplification based on a probabilistic model.

The information theory model may comprise a quantum measurement model in order to account for homodyne detection, intensity detection and/or post-selection.

According to the quantum measurement model, homodyne detection may be described by projective measurement operators. More specifically, according to the quantum measurement model of homodyne detection, intensity detection and/or post-selection may be described by a positive operator-valued measure (POVM). The measurement operators of the positive operator-valued measure (POVM) corresponding to bit values 0 and 1 may be defined in terms of projection operators of quadrature eigenstates. The measurement operators may comprise the minimal absolute value (Θ) of a quadrature. In this way, the minimal absolute value (Θ) may be accounted for in the information theory model as an input and/or optimization parameter.

The information theory model may comprise an algebraic or numeric expression for the expected key generation rate ($L_f/L$). The algebraic or numeric expression may provide an accurate estimate of the key generation rate ($L_f/L$) for secret shared cryptographic keys obtained from the random bit sequence after transmitting the first sequence of electromagnetic pulses from the sending unit to the receiving unit via the communication channel in the presence of loss and amplification, post-selection, error-correction and/or privacy amplification.

An optimization and/or maximization of the algebraic or numeric expression for the expected key generation rate ($L_f/L$) may be carried out using standard optimization routines comprised in the state of the art, e.g., in order to determine the at least one ciphering parameter and/or the ciphering protocol.

The invention also relates to an apparatus configured to carry out the steps of the method as described above. The apparatus may comprise the sending unit, the receiving unit, the communication channel, the plurality of spatially separated amplifiers, and/or an authenticated public classical channel.

The communication apparatus, the sending unit and/or the receiving unit may comprise an electronic evaluation and control unit. The electronic evaluation and control unit may comprise at least one computing unit and/or at least one electronic storage unit. The at least one computing unit may comprise the at least one processor, a CPU (central processing unit) and a GPU (graphical processing unit).

The sending unit may comprise a random number generator configured to generate the random bit sequence. Optionally, the random number generator may be a classical random number generator or a quantum random number generator. Optionally, the sending unit comprises an electromagnetic radiation source. The electromagnetic radiation source may be configured to generate the first sequence of electromagnetic pulses and/or may be configured to generate the at least one electromagnetic test pulse. Optionally, the electromagnetic radiation source may be a laser, a terahertz radiation source or a microwave radiation source.

Optionally, the at least one receiving unit may comprise a detector and measurement unit. The detector and measurement unit may be configured to detect and measure intensities and/or phases of the transmitted first sequence of electromagnetic pulses and/or the at least one electromagnetic test pulse.

The communication channel may comprise a transmission line and/or an optical fibre. Preferably, the communication channel comprises a plurality of transmission lines and/or optical fibres. The plurality of spatially separated amplifiers may be integrated and/or arranged in-line into the communication channel.

The sending unit may be configured to transmit the at least one electromagnetic test pulse via the communication channel to the receiving unit. The receiving unit may be configured to detect the at least one electromagnetic test pulse transmitted by the sending unit.

The electronic evaluation and control unit may be configured to determine the signal loss $r_E$ in the communication channel caused by an eavesdropper based on the at least one electromagnetic test pulse detected at the receiving unit.

The electronic evaluation and control unit may further be configured to determine at least one ciphering parameter of the ciphering protocol by maximizing the expected key generation rate ($L_f/L$) with respect to the at least one ciphering parameter using an information theory model for the expected key generation rate ($L_f/L$), wherein the determined signal loss ($r_E$) and at least one amplification parameter of the spatially separated amplifiers are taken into account as input parameters to the information theory model.

The information theory model may comprise an algebraic or numerical expression for the expected key generation rate ($L_f/L$) that is stored in the at least one electronic storage unit.

The sending unit may be configured to generate the first sequence of electromagnetic pulses such that each electromagnetic pulse of the first sequence of electromagnetic pulses corresponds to a bit of the random bit sequence according to the ciphering protocol.

The sending unit may further be configured to transmit the first sequence of electromagnetic pulses via the communication channel to the receiving unit.

The transmitting of an electromagnetic pulse may comprise emitting the electromagnetic pulse by the electromagnetic radiation source and/or sending the electromagnetic pulse along the communication channel using coupling means that connect the electromagnetic radiation source with the communication channel. The sending unit thus provides physical means for cyphering (encoding) and distributing a raw key comprised in the random bit sequence.

The at least one authenticated public classical channel may be configured to transmit feedback information from the at least one receiving unit to the at least one sending unit and/or vice versa, e.g., for performing the steps of post-selection, error-correction and/or privacy-amplification.

The invention also relates to a computer program product comprising instructions which, when executed by a computer, cause the computer to carry out the method as described further above. The invention also relates to a computer readable storage medium comprising instructions which, when executed by a computer, cause the computer to carry out the method as described further above. The computer program product can be stored in the computer readable storage medium. The computer readable storage medium can be comprised in the communication apparatus, the sending unit and/or the receiving unit.

In summary, a simple and practical method, communication apparatus, computer program and computer readable storage medium for determining a secret cryptographic key shared between a sending unit and a receiving unit has been proposed in order to achieve secure long-distance communications. With the proposed invention, efficient (quantum) key distribution with a high key exchange rate may be achieved over long distances exceeding 4,000 kilometres, preferably exceeding 20,000 kilometres.

Exemplary embodiments of the invention are illustrated in the drawings and will now be described with reference to FIGS. 1 to 9.

Techniques of the present disclosure will now be described with reference to exemplary embodiments, in a communication scenario in which a pair of communication units 1, 2 (conventionally called Alice 1 and Bob 2, respectively) that are connected by means of a quantum channel 3 and a classical information link 7 employ quantum techniques to share between them a cryptographic key about which an eavesdropper 5 (conventionally called Eve 5) tapping on the quantum channel 3 and/or the classical information link 7 can obtain (almost) no information. Such a cryptographic key could then be used by Alice 1 and Bob 2 as a cryptographic one-time pad for interchanging sensitive information.

A special emphasis of embodiments of the present disclosure is on reliable and secure techniques for enabling the sharing of such a cryptographic key when Alice 1 and Bob 2 are separated by large spatial distances so that losses may occur in the quantum channel 3 and the communication signals interchanged between Alice 1 and Bob 2 via the quantum channel 3 may need to be amplified.

1 Method Description

The invention proposes a method for a long-distance quantum key distribution (QKD) based on the signal amplification and physical control of the transmission line. A basic communication setup is illustrated schematically in FIG. 1.

In an exemplary communication protocol in the communication setup of FIG. 1, Alice 1 encodes a random bit string into a sequence of coherent pulses 6 and sends it to Bob 2 via the transmission line 3. The pulses pass through a sequence of Erbium Doped Fiber Amplifiers 4 (EDFAs), and the resulting signals are then received and measured by Bob 2. Also other types of optical amplifiers 4 preserving the phase coherence of electromagnetic pulses may be employed.

The eavesdropper 5 (Eve) can seize part of the signal: for instance, by bending the transmitting optical fiber and detecting the transcending optical modes. However, Alice 1 and Bob 2 monitor the losses in the line 3, and always know the proportion $r_E$ of the signal stolen by the eavesdropper Eve 5. Importantly, they can identify the exact losses caused and exploited by Eve 5. This knowledge enables Alice 1 and Bob 2 to adopt the most efficient bit ciphering and measurement scheme: Depending on $r_E$, Alice 1 picks certain values of signal intensities which are optimal as far as the informational advantage over Eve 5 is concerned; in a concerted manner, Bob 2 adjusts his measurement routine. This, in particular, gives the authorized parties additional leverage as far as post-selection is concerned: After transmitting and receiving the random bit string, Alice 1 and Bob 2 use an authenticated public classical channel 7 to perform information reconciliation (increasing their informational advantage over Eve 5) and privacy amplification with the optimal parameters of ciphering and measurement these procedures allow to eradicate Eve's 5 information without sacrificing too many bits.

Two principal ideas behind the method of the embodiment are: (i) the random bits are encoded into non-orthogonal coherent pulses 6 which are amplified by a cascade of the in-line EDFAs 4 to achieve long-distance transmission, and (ii) Alice 1 and Bob 2 can determine the exact proportion of the signal stolen by the eavesdropper 5 (Eve) and distinguish it from the natural losses in the line (caused primarily by the Rayleigh scattering). Alice 1 and Bob 2 use the knowledge about losses to accurately estimate their informational advantage over Eve 5 which in turn allows them to pick the pulses' intensities, adopt the measurement routine and perform post-selection in the most efficient way, leaving Eve 5 (almost) no information about the final shared key.

The communication protocol may proceed in the steps described in the paragraphs that follow.

0. Initial preparation.—The existing techniques allow to determine losses with high precision and distinguish local losses (which could be caused by Eve 5) from the intrinsic natural losses homogeneous across the whole line 3 and caused mainly by the Rayleigh and Raman scattering. As a part of the initial equipment setting, Alice 1 and Bob 2 determine the natural losses $r_0$ in the transmission line 3 which cannot be caused by Eve 5. Bob 1 and Alice 2 share the value of $r_0$ via the authenticated classical communication channel 7.

1. Alice 1 and Bob 2 determine a total signal loss $r_t$ in the communication channel 3 via transmitting test pulses, see Sec. 5. The electromagnetic test pulses are transmitted via the communication channel 3 from Alice 1 to Bob 2. After that, they obtain the signal loss $r_E$ caused by an eavesdropper 5 from the intrinsic signal loss $r_0$ and the total signal loss $r_t$. Bob 1 and Alice 2 share the value of $r_E$ via the authenticated classical communication channel 7.

For example, let us consider a section of the communication channel 3 which does not comprise amplifiers 4. If the intrinsic loss in this section is $r_0$ and Eve 5 seizes a proportion $r_E$ of the signal, then the total loss $r_t$ is determined from the equation $(1-r_t)=(1-r_E)(1-r_0)$. Further below we describe a beam splitter attack of Eve 5 at a single location along the communication channel 3. The proposed method and our analysis presented further below also generalizes to the case where Eve 5 intrudes the communication channel 3 at several locations.

2. Using a physical random number generator (possibly quantum), Alice 1 generates a bit sequence R of length L.
3. Alice 1 ciphers R into a series of L coherent light pulses which she sends to Bob 2 via the communication channel 3. The series of L coherent light pulses corresponds to the first sequence of electromagnetic pulses 6. The bits 0 and 1 are defined by the coherent states $\gamma_0=\gamma$ and $\gamma_1=-\gamma$ respectively, without loss of generality, assume that $\gamma \in \Re$ —and the value of $\gamma$ is chosen optimally given the known specific value of $r_E$. This means that Alice 1 uses such coherent states that they correspond to the maximum key generation speed with respect to the losses in the channel 3. The intensity of the pulse $\pm\gamma$ is determined by the average photon number $$\langle n \rangle = |\gamma|^2. \quad (1)$$

According to the ciphering protocol described above, the ciphering mode is phase-ciphering and the at least one ciphering parameter corresponds to the coherent state amplitude $\gamma$. The value of the coherent state amplitude $\gamma$ is chosen optimally by maximizing the key generation rate $L_f/L$ based on the information theory model.

4. The signal is amplified by a cascade of EDFAs 4 installed equidistantly along the whole optical line (communication channel 3). Each amplifier 4 compensates the losses in such a way that the amplified signal intensity equals to the initial one. As a coherent pulse passes through amplifiers 4, its state becomes mixed. Bob 2 receives the signal and performs a homodyne measurement, the parameters of which are again determined by the known value of $r_E$.
5. Alice 1 and Bob 2 apply information reconciliation (post-selection). Some of the Bob's 2 measurements will have inconclusive results, and the corresponding bits must be discarded. To do so, Bob 2 announces positions of invalid bits to Alice 1 publicly via an authenticated public classical channel 7.
6. Alice 1 and Bob 2 estimate the error rate and perform the error correction procedure.
7. Alice 1 and Bob 2 perform privacy amplification. Using a special protocol, Alice 1 and Bob 2 produce a shorter key, which Eve 5 has no (or negligibly small) information about. Once again, Alice 1 and Bob 2 may need to use their authenticated public classical channel 7.
8. Alice 1 and Bob 2 perform steps 1 to 7 repetitively until the length of the shared key is appropriate. Before we discuss the steps of the method in more detail, it is emphasized that the signal corresponding to the first sequence of electromagnetic pulses 6 is quantized and can be viewed as a sequence of photons. However, the discrete statistics of photons imposes a major limitation on Eve's 5 ability to extract information from measuring a part of the signal. In particular, if the initial signal contains, on average, $N=\langle n \rangle = |\gamma|^2$ photons, and the local leakage is quantified by transparency $r_E$, only a small fraction of the signal containing $n_E=Nr_E$ photons reaches Eve 5. In the case of a coherent signal state, the fluctuation of the photon number follows Poisson statistics, $\delta n_E = \sqrt{Nr_E}$. Therefore, the relative photon number fluctuations for Eve 5 are given by $\delta n_E/n_E=1/\sqrt{Nr_E}$. Large photon number fluctuations make it difficult for Eve 5 to distinguish the received electromagnetic pulses in order to make any sense of the seized signal. In turn, if Bob 2 gets an electromagnetic pulse comprising $n_B$ photons for which fluctuations are small, i.e. $\delta n_B \ll n_B$, then even a single-shot measurement provides Bob 2 with a high-probability of reliably establishing whether the received signal represents the bit value 0 or 1. Consequently, by determining the value of signal loss $r_E$ and choosing the coherent state amplitude $\gamma$ representing the at least one ciphering parameter according to the determined signal loss $r_E$ based on the information theory model in an optimized manner, it is ensured that Eve 5 cannot efficiently distinguish the received electromagnetic pulses, but Bob 2 can decipher the received electromagnetic pulses efficiently with the maximal key exchange rate. Therefore, a secure and efficient quantum key distribution method is provided based on the physical control of the transmission line 3.

2 Signal Amplification

In this section we address the physics of signal amplification in more detail. For this, we first introduce the framework based on P-function representation and show how the signal state evolves under the ideal amplification process. We then consider the practical case of amplification in doped fibers with the associated losses in the channel 3. We further show that a cascade of amplifiers 4 can be theoretically reduced to one effective amplifier—we will use this formal property in further sections for the analysis of legitimate users' informational advantage over the eavesdropper 5.

2.1 P-Function and its Evolution Under Amplification

Let us introduce our theoretical framework. Consider a single photonic mode with bosonic operators $\hat{a}$ and $\hat{a}^\dagger$ acting in the Fock space. To understand the effect of the amplification on the bosonic mode state, it is most convenient to use the P-function representation of the latter. Such representation allows to express any density operator as a quasi-mixture of coherent states:

$$\hat{\rho}=\int d^2\alpha P(\alpha)|\alpha\rangle\langle\alpha|, \quad (2)$$

where $d^2\alpha \equiv d\text{Re}(\alpha)\, d\text{Im}(\alpha)$ and the quasi-probability distribution $P(\alpha)$ is not necessarily positive. For a given state described by density matrix $\hat{\rho}$ the P-function can be written as $$P(\alpha) = tr\hat{\rho}{:}\delta(\hat{a}-\alpha){:} \quad (3)$$

where $$:\delta(\hat{a}-\alpha): = \frac{1}{\pi^2}\int d^2\beta e^{\alpha\beta^*-\alpha^*\beta}e^{\beta\hat{a}^\dagger}e^{-\beta^*\hat{a}}. \quad (4)$$

Additional details can be found in W. Vogel, D. G. Welsch, S. Wallentowitz: "Quantum Optics: An Introduction"; Wiley, 2001.

Phase-amplification is described by a quantum channel given by $$Amp_{G=\cosh^2(g)}{:}\hat{\rho} \mapsto Amp_G[\hat{\rho}] = tr_b \hat{U}_g \hat{\rho} \otimes |0\rangle\langle 0|_b \hat{U}_g^\dagger \quad (5)$$

$$\hat{U}_g = e^{g(\hat{a}^\dagger \hat{b}^\dagger - \hat{a}\hat{b})},$$

where g is the interaction parameter characterizing the amplifier, $G=\cosh^2(g)$ is the factor by which the intensity of the input signal is amplified (as we will explicitly see in the following formulae), and annihilation operator $\hat{b}$ corresponds to the auxiliary mode starting in the vacuum states. An explicit Kraus representation of the channel can be written as $$Amp_G(\hat{\rho}) = \sum_{n=0}^{\infty} \hat{K}_n \hat{\rho} \hat{K}_n \quad \text{with} \quad \hat{K}_n = \frac{\tanh^n(g)}{\sqrt{n!}} \hat{a}^{\dagger n} \cosh(g)^{-\hat{a}\hat{a}^\dagger}, \quad (6)$$

see e.g. P. Sekatski et al., "Cloning entangled photons to scales one can see"; Phys. Rev. A 82(5), November 2010.

To show how the P-function of a state changes under the amplification process, let us consider a simple situation where the input signal is in the pure coherent state $|\beta\rangle \langle \beta|$ with the corresponding initial P-function $P_i(\alpha) = \beta(\alpha - \beta)$ (delta-function on complex numbers). After the amplification, the P-function becomes $$P(\alpha; \beta, g) = tr: \delta(\hat{a}-a) : Amp_G[|\beta\rangle \langle \beta|]. \quad (7)$$

Bearing in mind that $$Amp^*_G[\hat{a}] = \hat{U}_g^\dagger \hat{a} \hat{U}_g = \cos h(g)\hat{a} + \sin h(g)\hat{b}^\dagger, \quad (8)$$

it is easy to see that $$P(\alpha; \beta, g) = \frac{1}{\pi(G-1)} \exp\left(-\frac{|\alpha - \sqrt{G}\beta|^2}{G-1}\right). \quad (9)$$

In other words, the output state is a mixture of normally distributed states centered around $|\sqrt{G}\beta\rangle$; the width of the distribution is $(G-1)/\sqrt{2}$.

2.2 Amplification in Doped Fibers and Losses

In an Er/Yt doped fiber the photonic mode propagates through the inverted atomic medium. To keep the medium inverted, a seed laser of a different frequency co-propagates with the signal photonic mode in the fiber and is then filtered out at the output by means of wavelength-division multiplexing (WDM). The interaction between the inverted atoms at position z and propagating light field mode â is given (up to a constant factor) by the Hamiltonian $$H = i(\hat{a}^\dagger \hat{b}_z^\dagger - \hat{a}\hat{b}_z), \quad (10)$$

where $\hat{b}_z$ corresponds to a collective desecration of one of the atoms. Hence, the evolution of the signal mode after its propagation through EDFA is set by a composition of infinitesimal phase-amplifications which, as we show in the next subsection, can be effectively reduced to a single amplification channel.

In practice, the performance of EDFA suffers from technical limitations, which come in addition to the amplification limits on added quantum noise. These limitations are mainly caused by two factors: the atomic population may be not completely inverted throughout the media, and coupling imperfection between the optical mode and EDFA or optical fiber.

Both of these mechanisms can be taken into account as a loss channel 3.1 acting on the state before the amplification, as shown by B. Sanguinetti et al., "Quantum cloning for absolute radiometry"; Phys. Rev. Lett. 105(8), August 2010.

Let us introduce the loss channel 3.1 describing all possible losses in the line 3. Equation (8) describes the action of amplifier on the annihilation operator in the Heisenberg picture. In the same way we can express the canonical transformation associated with losses $$Loss_T^*[\hat{a}] = \hat{U}_\lambda^\dagger \hat{a} \hat{U}_\lambda = \cos(\lambda)\hat{a} + \sin\lambda \hat{c} \quad (11)$$
$$= \sqrt{T}\hat{a} + \sqrt{1-T}\hat{c},$$
$$T = \cos^2(\lambda),$$

where $\lambda$ is the interaction parameter and T is the proportion of the transmitted signal. The annihilation operator $\hat{c}$ corresponds to the initially empty mode which the lost photons go to, and $\bar{U}_\lambda = e^{\lambda \hat{a}^\dagger \hat{c} - \lambda \hat{a} \hat{c}^\dagger}$.

2.3 Composition of Amplifiers and Losses

In our cryptographic scheme the amplification is used to recover the optical signal after it suffers from losses. Long-distance QKD requires a cascade of amplifiers 4, in which case the signal evolution is determined by a sequence of multiple loss 3.1 and amplification 4 channels.

In this section we prove that any such sequence can be mathematically reduced to a composition of one loss 3.1 and one amplification 4 channels. We will later adopt this simple representation for the informational analysis of our protocol.

Figure 2:
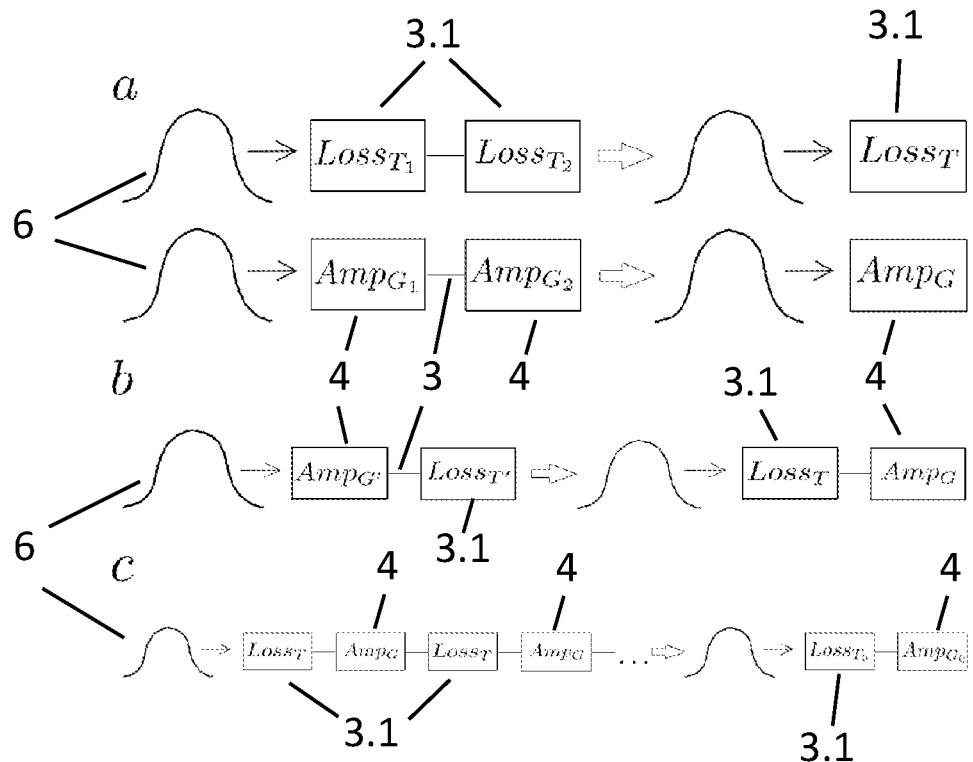

FIG. 2 graphically illustrates how (α) two loss 3.1 or amplification 4 channels can be reduced to one; (b) loss 3.1 and amplification 4 channels can be effectively rearranged; and (c) a series of losses 3.1 and amplifiers 4 can be reduced to one pair of loss 3.1 and amplification 4.

Statement 1. Two loss or amplification channels can be reduced to one

First, we show that a pair of loss 3.1 or amplification 4 channels can be effectively reduced to one, see FIG. 2 (a). Consider two consequent loss channels 3.1:

$$\begin{aligned}(Loss_{T_2} \circ Loss_{T_1})^*[\hat{a}] &= \hat{U}_{\lambda_1}^\dagger \hat{U}_{\lambda_2}^\dagger \hat{a} \hat{U}_{\lambda_2} \hat{U}_{\lambda_1} \\ &= Loss_{T_1}(\sqrt{T_a}\hat{a} + \sqrt{1-T_2}\hat{c}_2) \\ &= \sqrt{T_2 T_1}\hat{a} + \sqrt{T_2(1-T_1)}\hat{c}_1 + \sqrt{1-T_2}\hat{c}_2 \\ &= \sqrt{T_2 T_1}\hat{a} + \sqrt{1-T_1 T_2}\hat{c},\end{aligned} \quad (12)$$

where we defined operator $$\hat{c} = \frac{\sqrt{T_2(1-T_1)}\hat{c}_1 + \sqrt{1-T_2}\hat{c}_2}{\sqrt{1-T_1 T_2}}, \quad (13)$$

acting on the vacuum state and satisfying the canonical commutation relation $[\hat{c}, \hat{c}^\dagger] = 1$. We can thus represent two channels in the form of one effective channel:

$$Loss_{T_2} \cdot Loss_{T_1} = Loss_{(T = T_1 T_2)} \quad (14)$$

The same reasoning can be applied to amplifiers 4:

$$Amp_{G_2} Amp_{G_1} = Amp_{(G = G_2 G_1)} \quad (15)$$

Statement 2. Loss and amplification channels can be effectively rearranged

Let us show that a composition of an amplification channel 4 followed by a loss channel 3.1 can be mathematically replaced with a pair of certain loss 3.1 and amplification 4 channels acting in the opposite order, cf. FIG. 2 (b). Consider the transformation corresponding to an amplification followed by a loss $$\begin{aligned}(Loss_{T_2} \circ Amp_G)^*[\hat{a}] &= \hat{U}_g^\dagger \hat{U}_{\lambda'}^\dagger \hat{a} \hat{U}_{\lambda} \hat{U}_g \\ &= Amp_G^*[\sqrt{T'}\hat{a} + \sqrt{1-T'}\hat{c}] \\ &= \sqrt{T'G}\hat{a} + \sqrt{(1-T')}\hat{c} + \sqrt{T'(G'-1)}\hat{b}^\dagger.\end{aligned} \quad (16)$$

In the case of the opposite order we have $$(Amp_G \circ Loss_T)^*[\hat{a}] = \hat{U}_\lambda^\dagger \hat{U}_g^\dagger \hat{a} \hat{U}_g \hat{U}_\lambda \quad (17)$$
$$= Loss_T^*\left[\sqrt{G}\,\hat{a} + \sqrt{G-1}\,\hat{b}^\dagger\right]$$
$$= \sqrt{TG}\,\hat{a} + \sqrt{G(1-T)}\,\hat{c} + \sqrt{G-1}\,\hat{b}^\dagger.$$

It is easy to see that the two transformations are identical if $$\boxed{\begin{aligned} Loss_{T'} \circ Amp_{G'} &= Amp_G \circ Loss_T \\ T &= \frac{G'T'}{(G'-1)T'+1} \\ G &= (G'-1)T'+1. \end{aligned}} \quad (18)$$

In other words, the two types of channels "commute" provided that the parameters are modified in accord with these relation. In particular, the parameters in the equation above are always physically meaningful $G \geq 1$, $0 \leq T \leq 1$, meaning that we can always represent loss and amplification in form of a composition where loss is followed by amplification (the converse is not true).

Statement 3. A series of losses and amplifiers can be reduced to one pair of loss and amplification.

Let us finally show that a sequence of loss 3.1 and amplification 4 channels can be mathematically represented as one pair of loss and amplification, see FIG. 2(c). Consider the transformation $$\Phi_M = (Amp_G \cdot Loss_T)^{\circ M}, \quad (19)$$

corresponding to a series of M identical loss and amplification channels 4, for which we want to find a simple representation. According to Statement 2, we can effectively move all losses to the right end of the composition, i.e., permute the channels is such a way that all losses act before amplification. Every time a loss channel 3.1 with transmission probability $T_{(i)}$ is moved before an amplifier 4 with amplification factor $G_{(i)}$, the parameters are transformed in accord with Eq. (18):

$$T_{(i)} \mapsto T_{(i+1)} = \frac{G_{(i)}T_{(i)}}{(G_{(i)}-1)T_{(i)}+1} \quad (20)$$
$$G_{(i)} \mapsto G_{(i+1)} = (G_{(i)}-1)T_{(i)}+1.$$

In our sequence we can pairwise transpose all neighboring loss with amplifier (starting with the first amplifier and the second loss). After repeating this $M-1$ times, bearing in mind Statement 1, we find that $$\Phi_M = Amp_{G_{(0)}} \circ Amp_{G_{(1)}} \circ \ldots \circ Amp_{G_{(M-1)}} \circ \quad (21)$$
$$Loss_{T_{(M-1)}} \circ Loss_{T_{(M-2)}} \circ \ldots \circ Loss_{T_{(0)}}$$
$$= Amp_{G_\circ} \circ Loss_{T_\circ},$$
$$\text{where } T_\circ = \prod_{i=0}^{M-1} T_{(i)}, \ G_\circ = \prod_{i=0}^{M-1} G_{(i)}, \quad (22)$$

i.e., a series of losses and amplifiers is equivalent to a loss channel 3.1 of transmission $T_\circ$ followed by an amplifier 4 with amplification factor $G_\circ$.

Note now that the value $\mu \equiv G_{(i)} T_{(i)} = GT$ cannot be changed by permutations. Let us define $$F_{(i)} = (G_{(i)}-1)T_{(i)}+1, \quad (23)$$

and bear in mind that $$F_{(i+1)} = (G_{(i+1)}-1)T_{(i+1)}+1 = \frac{(F_{(i)}-1)}{F_{(i)}}TG+1 = \mu\left(\frac{F_{(i)}-1}{F_{(i)}}\right)+1. \quad (24)$$

We can write $$T_{(i+1)} = \frac{TG}{F_{(i)}} \quad (25)$$

$$G_{(i+1)} = F_{(i)}, \text{ and}$$

$$G_\circ = G\prod_{i=0}^{M-2} F_{(i)}, \quad (26)$$

$$T_\circ = \frac{T(TG)^{M-1}}{\prod_{i=0}^{M-2} F_{(i)}} = \frac{(TG)^M}{G_\circ}.$$

Let us find the explicit form of $G_\circ$ and $T_\circ$ by solving the recurrence relation. Define $A_n$ and $B_n$ through the relation $$F_{(n-1)} = \frac{A_n}{B_n}. \quad (27)$$

$$\text{Then } F_{(n+1)} = \frac{(\mu+1)F_{(n)}-\mu}{F_{(n)}} = \frac{(\mu+1)A_{n+1}-\mu B_{n+1}}{A_{n+1}}. \quad (28)$$

It follows from Eqs. (27) and (28) that $B_{n+1} = A_n$ and $$A_{n+1} = (\mu+1)A_n - \mu B_n = (\mu+1)A_n - \mu A_{n-1}. \quad (29)$$

We see that the solution of this equation has a form $$A_n = c_1 + c_2 \mu^n, \quad (30)$$

where $c_1$ and $c_2$ are the constants, which are determined by $F_0 = (G-1)T+1$: we take $A_1 = (G-1)T+1$ and $A_0 = 1$, and obtain $$c_1 = \frac{T-1}{GT-1} \quad (31)$$

$$c_2 = \frac{(G-1)T}{GT-1}.$$

Notably, the product $\prod_{n=0}^{M-2} F_{(n)}$ appearing in the final expression becomes relatively simple $$\prod_{i=0}^{M-2} F_{(n)} = \prod_{n=0}^{M-2} \frac{A_{n+1}}{A_n} = \frac{A_{M-1}}{A_0} \quad (32)$$

$$= \frac{(G-1)(GT)^M + G(T-1)}{G(GT-1)},$$

and we have $$\boxed{\begin{aligned} \Phi_M &= (Amp_G \circ Loss_T)^{\circ M} = Amp_{G_\circ} \circ Loss_{T_\circ} \\ G_\circ &= \frac{(G-1)(GT)^M + G(T-1)}{GT-1} \\ T_\circ &= \frac{(TG)^M}{G_\circ}. \end{aligned}} \quad (33)$$

The case of TG=1 is particularly interesting as the average intensity of the transmitted signal remains preserved (which is different from the total output intensity as it has the noise contribution). In the limit G→1/T we have $$G_\circ = G(M(1-T)+T)$$
$$T_\circ = \frac{T}{M(1-T)+T},$$
(34)

3 Control of the Transmission Line

To monitor the eavesdropper's 5 activity, Alice 1 may send, at appropriate intervals, special test pulses (individual or many, see the discussion below) and cross-check the intensities with Bob 2. The test pulses should comprise a large number of photons, but should not, however, damage Bob's 2 detection equipment 2.2. By producing and analysing the corresponding scattering matrix, Alice 1 and Bob 2 can determine the losses in the channel 3. Importantly, the authorized parties can classify the losses into those which are and are not caused and exploited by Eve 5.

Assume that the transmission line 3 (optical fiber) is properly installed, i.e., it does not have points of significant inflections and crude junctions. Then, most of the intrinsic natural losses in the line occur due to Rayleigh scattering. Such losses are distributed across the whole line. Therefore, Eve 5 cannot pick up the dissipated signal effectively, unless she has an antenna covering a significant part of the line 3—and the concealed construction of such an antenna is not practically feasible.

The only option remaining to the eavesdropper 5 is to take away part of the signal deliberately, that is to create and exploit the losses additional to the natural ones (namely, by bending the optical fiber intentionally). Alice 1 and Bob 2 can identify and measure such artificial losses. To do that, they must first determine the magnitude of losses not associated with the eavesdropper's 5 activity; this can be done by measuring the losses appearing homogeneously across the hole line before the beginning of the protocol. After that, Alice 1 and Bob 2 can precisely determine the newly appearing local leaks of the signal (with proportion $r_E$) possibly intercepted by Eve 5. This knowledge ensures the most efficient ciphering and measurements routines, determining in turn the post-selection procedure.

We propose the following method for detection of losses allowing to improve the efficiency of the protocol:

Let $\tau_S$ be the length of the signal pulse, and $\tau_T$ be the total length of a sequence of test pulse (test pulses may look completely like the signal ones, but their sequence should contain much more photons than one signal pulse). Both types of pulses can be characterized by the same constant power, e.g., P=20 mW, but $\tau_T$ should be much greater than $\tau_S$, e.g., $\tau_T$=1 ms and $\tau_S$=1 ns. The average number of photons in the test pulse is $$\langle n_T \rangle = \frac{P\tau_T}{h\nu} \sim 10^{14},$$

where $\nu$ is the light frequency. The measurement error $\delta n_T$ on Bob's 2 side has two main contributions:

The detection error due to the Poisson statistics of light $\delta n_T^P \sim \sqrt{\langle n_T \rangle} \sim 10^7$.

The error due to the pulse amplification $\delta n_T^A \sim \sqrt{\langle n_T \rangle GM}$ (when GM>>1), where G is the amplification factor of a single amplifier 4 and M is the total number of amplifiers 4. If the distance between two neighboring amplifiers 4 is d=50 km, and the distance between Alice 1 and Bob 2 is $D_{AB}$=10000 km, then M=200 and G=10 in which case $\delta n_T^A \sim 10^9$.

Thus, $\delta n_T$ is determined by $\delta n_T^A$. The test pulse allows to detect leakage of magnitudes $r_E \geq \delta T_T = \delta n_T/\langle n_T \rangle = 10^{-5}$. Similar control and analysis of the reflected signal must be performed on Alice's 1 end.

Other possibilities for the testing procedure:

1. Individual pulses.—Alice 1 sends a single testing pulse the parameters of which are chosen randomly. The preparation of the pulse implies generating an auxiliary random bit sequence and translating it into the random intensity, phase (e.g., from 0 to $\pi$), length (e.g., from 1 to $10^6$ ns) and shape of the pulse. After Bob 2 measures the test pulse, he verifies its parameters with Alice 1, and they determine the losses in the channel 3.

2. Sequence of pulses.—Alice 1 sends a sequence of test pulses in which she encodes an auxiliary random sequence. This involves generating an auxiliary random sequence and ciphering it (using, for instance, the intensity or phase ciphering adjusted for the classical intensities) in a sequence of pulses. Bob 2 measures the pulses, verifies the encoded message with Alice 1, after what they determine the losses.

4 Measurement Scheme

The state of the optical signal can be described in terms of its quadratures given by operators $$\hat{q} = \frac{\hat{a}^\dagger + \hat{a}}{2},$$
$$\hat{p} = \frac{i(\hat{a}^\dagger - \hat{a})}{2}.$$
(35)

These operators represent the real and imaginary parts of the signal's complex amplitude, and by measuring one of the quadratures one can distinguish between different signals.

Figure 3:
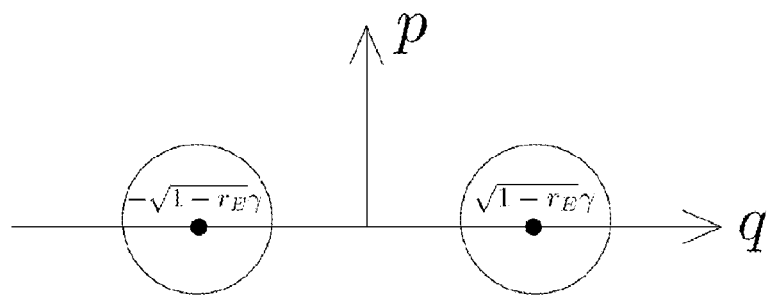

Bob 2 needs to distinguish between two states $|\gamma_0\rangle = |\gamma\rangle$ and $|\gamma_1\rangle = |-\gamma\rangle$ (with $\gamma \in (\mathcal{R})$ transformed by losses and amplifiers 4,—two Gaussians with centers laying on the real axis (q-axis) of the optical phase space. This is illustrated in FIG. 3, which shows the optical phase diagrams of states corresponding to bit values 0 and 1 after they pass through the sequence of losses 3.1 and amplifications 4. The two output states constitute Gaussians centered at $\pm\sqrt{1-r_E}\gamma$, where $r_E$ is the proportion of signal stolen by Eve 5. To this end, Bob 2 measures the $\hat{q}$-quadrature. Bob 2 may perform his measurements by means of homodyne detection described by the following POVM operators:

$$\hat{E}_0 = \int_\Theta^\infty dq |q\rangle\langle q|,$$

$$\hat{E}_1 = \int_{-\infty}^{-\Theta} dq |q\rangle\langle q|,$$

$$\hat{E}_{fail} = \hat{I} - \hat{E}_0 - \hat{E}_1,$$
(36)

where $|q\rangle$ is the eigenstate of $\hat{q}$, and the parameter $\Theta$ is tuned by Bob 2 depending on the amount of losses possibly stolen by Eve 5, cf. A. Peres, "Quantum Theory. Concepts and Methods"; Fundamental Theories of Physics; Springer Netherlands, 2006, and the discussion further below. More specifically, the parameter $\Theta$ is determined by maximizing the expected key generation rate based on the information theory model.

In Eq. (36), $\hat{E}_{0(1)}$ determines the bit value 0(1), whereas $\hat{E}_{fail}$ is associated with the bad outcome and the respective bit should be discarded by Alice 1 and Bob 2 on the stage of post-selection.

Figure 4:
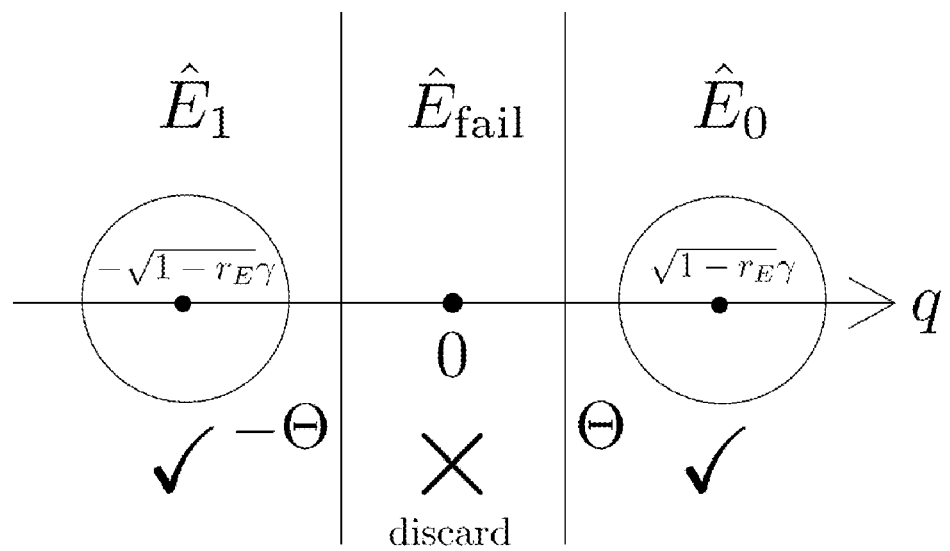

FIG. 4 is a schematic representation of the POVM employed by Bob 2. The two signal states are Gaussians overlapping the most in the region of phase space corresponding to $\hat{E}_{fail}$. Therefore, Alice 1 and Bob 2 consider the associated outcome inconclusive and discard it on the post-selection stage. The outcomes associated with $\hat{E}_0$ and $\hat{E}_1$ are considered conclusive. The value of $\Theta$ is varied to perform the most efficient post-selection procedure as far as the final key generation rate is concerned (optimization based on the information theory model). By looking at FIG. 4, one can see that $\hat{E}_{fail}$ corresponds to the phase space region where the two states (Gaussians) overlap the most, and thus the associated outcome is inconclusive. Thus, bits corresponding to received electromagnetic pulses whose quadrature falls into the region of phase space corresponding to $\hat{E}_{fail}$ are discarded.

5 Error Estimate and Correction

After the measurements and post-selection procedure of discarding invalid bits, Alice 1 and Bob 2 may perform an error correction procedure. The quadrature value q obtained from the homodyne measurement allows to estimate the probability of error in the corresponding bit one can easily compute the conditional error probability for every q. In reality, the error rate is also determined by channel imperfections and Eve's 5 detrimental activities. Therefore, in practice, instead of the theoretical prognosis, the error correction procedure should be mainly predicated based on the direct measurement of error, e.g., by disclosing a part of the raw key to observe the error. The raw key corresponds to the shared bit sequence obtained from post selection.

One option for the practical error estimation is to disclose one half of the raw key. But if the raw key is long enough (e.g., more than 10,000 bits), already a relatively short part (e.g., 1,000 bits) can provide an accurate error estimate. According to this technique, Alice 1 and Bob 2 may use their public authenticated channel 7 to select a number of bit positions in the raw key and publicly announce the corresponding bit values. Then, using Bayes' theorem, they can make a guess about the expected error rate for the remaining part of the raw key. Alternatively, instead of the bit values Alice 1 and Bob 2 can disclose the parity bits for some selected blocks of raw key positions. This method gives a better estimate for small error rate values, but is worse for high error rates. The decision about the block size can be made taking into account the theoretical estimates based on the observed values of q. For example, if the raw error estimate is approximately 6%, blocks of length 10 can be used, since the probability for parity bits mismatch in this case is approximately 36%, which is large, but still below 50%, meaning that the parity data reveal a lot of information about the real error rate.

After estimating the error rate, Alice 1 and Bob 2 may perform an error correction procedure. For this they may use the low-density parity-check (LDPC) codes as described in D. J. C. MacKay: "Information Theory, Inference and Learning Algorithms"; Cambridge University Press, 2003. The input for such codes are the probabilities of zero or one at each bit position and the syndrome of the correct bit string the set of parity bits which are sufficient to correct the errors, taking into account the a priori probabilities for each position. LDPC codes are particularly good for error correction after homodyne measurement, since the measurement result q itself allows to calculate the probabilities for correct and erroneous results.

After Alice 1 and Bob 2 correct errors in a (possibly small) part of the raw key, they can take into account the number of errors in this part to yield a more accurate error estimate for the remaining key. We propose the following adaptive procedure:

Alice 1 and Bob 2 first take a relatively short subset of the original raw key (whose size depends on the codeword's length, e.g., 1,000 bits), and apply an error correcting procedure which is designed for high error rates (e.g., 10% in the case that the preliminary crude estimation gave just 5% error probability). After correcting errors in this small subset, Alice 1 and Bob 2 know the number of errors therein, and have a better error rate estimate for the remaining part of the key. Then, they can take another short subset (e.g., once again, 1,000 bits) and perform error correction according to the new improved error rate estimate, and so on. With each iteration, the error estimate becomes more accurate, making the error correction procedure more efficient. This method can be applied without having an initial error estimate at all, which can save Alice 1 and Bob 2 a large part of the raw key.

The error correction procedure discloses some information about the key. For linear codes like LDPC codes, one syndrome bit discloses no more than one bit of information about the key, thus the syndrome length is an appropriate upper bound for the information leakage.

6 Privacy Amplification

Although after the error correction procedure, Alice 1 and Bob 2 share the same bit string, this string can be correlated with Eve 5, thus it should not be used as the final secret key. The key distillation procedure described by C. H. Bennett et al., "Privacy amplification by public discussion"; SIAM J. Comput. 17(2): 210-229, April 1988; and G. Brassard and L. Salvail, "Secret-key reconciliation by public discussion"; Proc. EUROCRYPT '93, Springer 1994, pp. 410-423, is aimed to eradicate Eve's 5 information, and produces a new shorter bit string. This new string can finally be used as a secret key as Eve 5 does not possess any (or almost any) information about it.

To eliminate the eavesdropper information, Alice 1 and Bob 2 can, for instance, use a universal hashing method. This method requires them to initially agree on the family H of hash functions h∈H. At the privacy amplification stage, they randomly select such a function h: $\{0,1\}^{l_1} \rightarrow \{0,1\}^{l_2}$ from this family that maps the original bit string of length $l_1$ to the final key of length $l_2$. If Eve 5 knows e bits from the raw key, $l_2$ must be equal to $l_1-e$. The original bit string corresponds to the shared bit sequence obtained from the received first sequence of electromagnetic pulses 6 after post selection and error correction.

One example of H is the Toeplitz matrices family. Alice 1 and Bob 2 can use a random binary Toeplitz matrix T with $l_1$ rows and $l_2$ columns. Then they represent their (original) bit string as a binary vector v, and the final key k is given by k=T·v.

7 Eve's Attack

In the following, a beam splitter model of the eavesdropper Eve 5 is described:

Let us demonstrate the operation of the protocol in the case where Eve 5 performs a beam splitter attack seizing part of the signal somewhere along the optical line 3.

Here we will use the term "beam splitter" to refer to the point of Eve's 5 intervention into the line 3. The beam splitter is assumed ideal, meaning that there is no reflection in Alice's 1 direction. If the signal (input) intensity incident to the beam splitter is 1, then intensity $r_E$ goes to Eve 5 (first output), and $1-r_E$ goes to Bob's 2 direction (second output).

Figure 5:
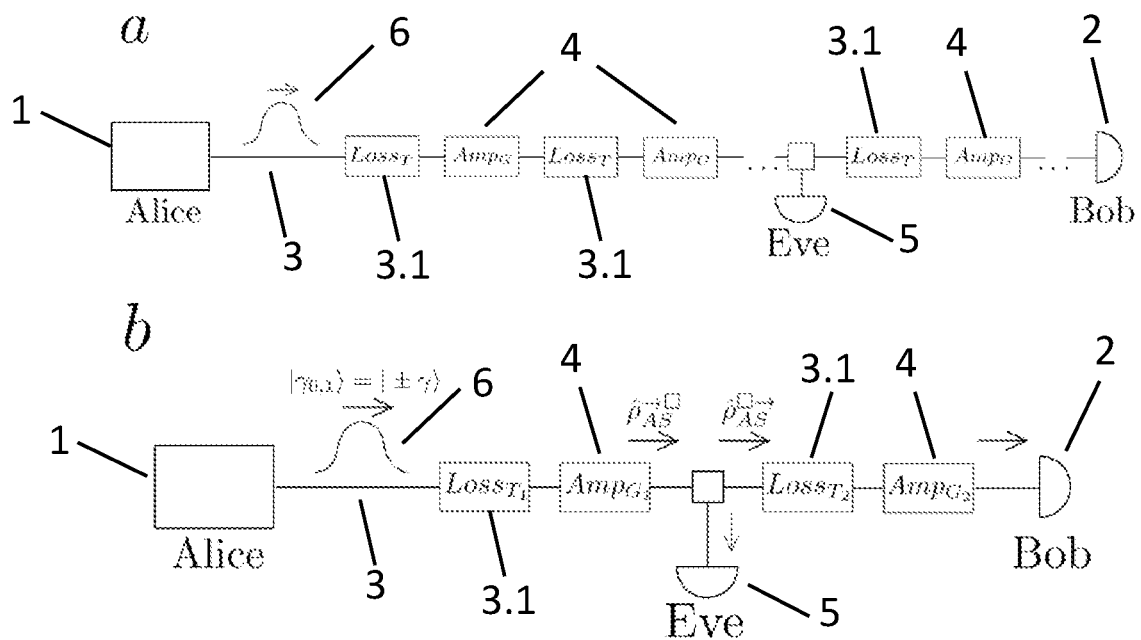

FIG. 5 schematically illustrates (a) the beam splitter attack on the protocol; Eve 5 seizes part of the signal somewhere along the optical line 3; and (b) a scheme equivalent to (a), in which the losses and amplifiers 4 before and after the point of Eve's 5 intervention are represented by two pairs of loss and amplification channels 3.1, 4 defined by the parameters $\{T_1, G_1\}$ and $\{T_2, G_2\}$ respectively.

7.1 Losses and Amplifiers

The proportion of transmitted signal on distance d between two neighbouring amplifiers 4 is determined by the loss factor $$T = 10^{-\mu d}, \quad (37)$$

where $\mu = 1/50$ km$^{-1}$ is the parameter of losses typical for the optical fibers. The loss factor may also be expressed as $T = 1 - r_0$, where $r_0$ corresponds to the intrinsic loss occurring in the communication channel 3 between two neighbouring amplifiers 4. As was mentioned before, the amplification factor of each amplifier is G=1/T. Let $D_{AB\ (AE)}$ be the distance between Alice 1 and Bob 2 (Alice 1 and Eve 5), then the numbers of amplifiers 4 before and after the beam splitter $M_1$ and $M_2$ are given by $$M_1 = D_{AE}/d, \quad (38)$$

$$M_2 = (D_{AB} - D_{AE})/d. \quad (39)$$

In accord with the Statement 3 from Sec. 2.3 and as illustrated in FIG. 5 (b), the scheme can be simplified by reducing the losses and amplifications before and after the beam splitter to two loss and amplification pairs with the parameters $\{T_1, G_1\}$ and $\{T_2, G_2\}$ respectively:

$$T_1 = \frac{T}{M_1(1-T)+T} = \frac{10^{-\mu d}}{(1-10^{-\mu d})D_{AE}/d + 10^{-\mu d}}, G_1 = \frac{1}{T_1}, \quad (40)$$

$$T_2 = \frac{T}{M_2(1-T)+T} = \frac{10^{-\mu d}}{(1-10^{-\mu d})(D_{AB}-D_{AE})/d + 10^{-\mu d}}, G_2 = \frac{1}{T_2}.$$

The following, describes the information theory model for the expected key generation rate $L_f/L$ used to determine the at least one ciphering parameter and the ciphering protocol:

7.2 Evolution of Systems' State

This section of the disclosure describes the progressive evolution of the combined systems' state. The initial state of Alice's 1 random bit (A) her random number generator and the corresponding signal (S) is given by $$\hat{\rho}_{AS}{}^i = \frac{1}{2}|0\rangle\langle 0|_A \otimes |\gamma\rangle\langle\gamma|_S + \frac{1}{2}|1\rangle\langle 1|_A \otimes |-\gamma\rangle\langle -\gamma|_S. \quad (41)$$

As the signal undergoes transformations associated with losses and amplifications, the state of the AS-system just before the signal passes the beam splitter is given by $$\hat{\rho}_{AS}^- = \frac{1}{2}|0\rangle\langle 0|_A \otimes \int d^2\alpha P_{\sqrt{T_1}\gamma,G_1}(\alpha)|\alpha\rangle\langle\alpha|_S + \quad (42)$$

$$\frac{1}{2}|1\rangle\langle 1|_A \otimes \int d^2\alpha P_{-\sqrt{T_1}\gamma,G_1}(\alpha)|\alpha\rangle\langle\alpha|_S$$

$$= \frac{1}{2}|0\rangle\langle 0|_A \otimes \int d^2\alpha \frac{1}{\pi(G_1-1)} e^{-\frac{|\alpha-\sqrt{G_1 T_1}\gamma|^2}{G_1-1}} |\alpha\rangle\langle\alpha|_S +$$

$$\frac{1}{2}|1\rangle\langle 1|_A \otimes \int d^2\alpha \frac{1}{\pi(G_1-1)} e^{-\frac{|\alpha-\sqrt{G_1 T_1}\gamma|^2}{G_1-1}} |-\alpha\rangle\langle -\alpha|_S.$$

Defining $$\hat{\rho}_{AS}^-[\alpha] = \frac{1}{2}|0\rangle\langle 0|_A \otimes |\alpha\rangle\langle\alpha|_S + \frac{1}{2}|1\rangle\langle 1|_A \otimes |-\alpha\rangle\langle -\alpha|_S, \quad (43)$$

we can rewrite Eq. (42) as $$\hat{\rho}_{AS}^{\rightarrow} = \int d^2\alpha P_{\sqrt{T_1}\gamma,G_1}(\alpha)\hat{\rho}_{AS}^{\rightarrow}[\alpha]. \quad (44)$$

Just after the signal passes the beam splitter, the state of the joint system comprising Alice's 1 random bit (A), the signal going to Bob 2 (5) and signal seized by Eve 5 (E) is described by $$\hat{\rho}_{A\vec{S}E} = \int d^2\alpha P_{\sqrt{T_1}\gamma,G_1}(\alpha)\hat{\rho}_{A\vec{S}E}[\alpha] \text{ where} \quad (45)$$

$$\hat{\rho}_{A\vec{S}E}[\alpha] = \frac{1}{2}|0\rangle\langle 0|_A \otimes \left|\sqrt{1-r_E}\,\alpha\right\rangle\!\left\langle\sqrt{1-r_E}\,\alpha\right|_S \otimes \left|\sqrt{r_E}\,\alpha\right\rangle\!\left\langle\sqrt{r_E}\,\alpha\right|_E + \frac{1}{2}|1\rangle\langle 1|_A \otimes \left|-\sqrt{1-r_E}\,\alpha\right\rangle\!\left\langle-\sqrt{1-r_E}\,\alpha\right|_S \otimes \left|-\sqrt{r_E}\,\alpha\right\rangle\!\left\langle-\sqrt{r_E}\,\alpha\right|_E, \quad (46)$$

and $r_E$ is the proportion of signal stolen by Eve 5. After the signal undergoes the second sequence of losses and amplifiers and just before it is measured by Bob 2, the state of the joint system is $$\hat{\rho}_{ASE}^{\rightarrow Bob} = \int d^2\alpha P_{\sqrt{T_1}\gamma,G_1}(\alpha)\hat{\rho}_{ASE}^{\rightarrow Bob}[\alpha] \quad (47)$$

with $$\hat{\rho}_{ABE}^f[\alpha] = \frac{1}{2}\left|0\right\rangle\!\!\left\langle 0\right|_A \otimes \left(\int d^2\beta P_{\sqrt{(1-r_E)T_2}\,\alpha,G_2}(\beta)\,\big|\beta\rangle\right) \quad (48)$$

$$\langle\beta|_S \otimes \left|\sqrt{r_E}\,\alpha\right\rangle_E + \frac{1}{2}\left|1\right\rangle\!\!\left\langle 1\right|_A \otimes \left(\int d^2\beta P_{\sqrt{(1-r_E)T_2}\,\alpha,G_2}(\beta)\,\big|\beta\rangle\right)$$

$$\langle\beta|_S \otimes \left|-\sqrt{r_E}\,\alpha\right\rangle\!\left\langle-\sqrt{r_E}\,\alpha\right|_E = \frac{1}{2}\sum_{\alpha=0,1}\,\big|\alpha\rangle$$

$$\langle\alpha|_A \otimes \left(\int d^2\beta P_{\sqrt{(1-r_E)T_2}\,\alpha,G_2}(\beta)\,\big|\beta\rangle\right)\langle\beta|_S \otimes \left|(-1)^\alpha\sqrt{r_E}\,\alpha\right\rangle\!\left\langle(-1)^\alpha\sqrt{r_E}\,\alpha\right|_E.$$

Bob 2 may receive the signal, may measure it and, together with Alice 1, may perform post-selection, which involves discarding the bits associated with the fail-outcome by communicating through the classical channel 7. The probability that Bob's 2 measurement outcome is $b=\{0, 1\}$ given that Alice 1 sent bit is $\alpha=\{0, 1\}$ can be written as $$p(b|a) = tr_{ASE}[(2\cdot|a\rangle\langle a|_A \otimes \hat{E}_b \otimes \mathbb{I}_E)\hat{\rho}_{\rightarrow Bob}^{ASE}] = \quad (49)$$

$$\int d^2\alpha P_{\sqrt{T_1}\gamma,G_1}(\alpha)p_{(-1)^a\alpha}(b|a),$$

$$p_{(-1)^a\alpha}(b|a) = \int d^2\beta P_{\sqrt{(1-r_E)T_2}(-1)^a\alpha,G_2}(\beta)\langle\beta|\hat{E}_b|\beta\rangle_S. \quad (50)$$

Thus, the probability of a conclusive outcome, which means that the bit will not be discarded on the stage of post-selection is $$p(\checkmark) = \quad (51)$$

$$\frac{1}{2}\sum_{a,b=0,1} p(b|a) = \int d^2\alpha P_{\sqrt{T_1}\gamma,G_1}(\alpha)\Sigma_{b=0,1}\frac{p_\alpha(b|0)+p_{-\alpha}(b|1)}{2}.$$

The final state of Alice's 1 random bit (A), Bob's 2 memory device storing the measurement outcome (B) and the signal stolen by Eve 5 (E) after the post-selection, i.e., conditional to the successful measurement outcome, is $$\hat{\rho}_{ABE}^f = \int d^2\alpha P_{\sqrt{T_1}\gamma,G_1}(\alpha)\hat{\rho}_{ABE}^f[\alpha] \quad (52)$$

where $$\hat{\rho}_{ABE}^f[\alpha] = \frac{1}{2}\left|0\right\rangle\!\!\left\langle 0\right|_A \otimes \left(\sum_{b=0,1}\frac{p_\alpha(b|0)}{p(\checkmark)}\,|b\rangle\langle b|_B\right)\otimes\left|\sqrt{r_E}\,\alpha\right\rangle \quad (53)$$

$$\left\langle\sqrt{r_E}\,\alpha\right|_E + \frac{1}{2}\left|1\right\rangle\!\!\left\langle 1\right|_A \otimes \left(\sum_{b=0,1}\frac{p_{-\alpha}(b|1)}{p(\checkmark)}\,|b\rangle\langle b|_B\right)\otimes\left|-\sqrt{r_E}\,\alpha\right\rangle\!\left\langle-\sqrt{r_E}\,\alpha\right|_E.$$

7.3 Probabilities

The following introduces probabilistic models in order to describe the steps of post-selection, error correction and privacy amplification:

To obtain the probabilities $p(b|a)$, $a, b \in \{0, 1\}$, we must first calculate $|\langle \beta | q \rangle|^2$:

$$|\langle \beta | q \rangle|^2 = \langle \beta | q \rangle \langle q | \beta \rangle =$$

$$\left\langle \beta \left| \left( \frac{1}{2\pi} \int dp\, e^{ip(\hat{q}-q)} \right) \right| \beta \right\rangle = \frac{1}{2\pi} \int dp \left\langle \beta \left| e^{ip\left(\frac{\hat{a}^\dagger + \hat{a}}{\sqrt{2}} - q\right)} \right| \beta \right\rangle = \sqrt{\frac{2}{\pi}} e^{-2(\mathrm{Re}\beta - q)^2}. \quad (54)$$

After substituting $|\langle \beta | q \rangle|^2$ into Eqs. (49), (50) we obtain $$p(b=0 | a=0) =$$

$$\int d^2\alpha P_{\sqrt{T_1}\gamma,G_1}(\alpha) \int d^2\beta P_{\sqrt{(1-r_E)T_2}\alpha,G_2}(\beta) \int_\Theta^\infty dq \sqrt{\frac{2}{\pi}} e^{-2(\mathrm{Re}\beta - q)^2} = \frac{1}{2}\left\{1 - \mathrm{erf}\left( \frac{\sqrt{2}\left[-\gamma\sqrt{G_1 T_1 G_2 T_2 (1-r_E)}\right]}{\sqrt{1+2(G_2-1)+2G_2 T_2(1-r_E)(G_1-1)}} \right)\right\}, \quad (55)$$

$$p(1|0) = \frac{1}{2}\left\{1 - \left( \frac{\sqrt{2}\left[\Theta + \gamma\sqrt{G_1 T_1 G_2 T_2 (1-r_E)}\right]}{\sqrt{1+2(G_2-1)+2G_2 T_2(1-r_E)(G_1-1)}} \right)\right\}, \quad (56)$$

$$p(0|1) = \frac{1}{2}\left\{1 - \left( \frac{\sqrt{2}\left[\Theta + \gamma\sqrt{G_1 T_1 G_2 T_2 (1-r_E)}\right]}{\sqrt{1+2(G_2-1)+2G_2 T_2(1-r_E)(G_1-1)}} \right)\right\}, \quad (57)$$

$$p(1|1) = \frac{1}{2}\left\{1 - \left( \frac{\sqrt{2}\left[\Theta + \gamma\sqrt{G_1 T_1 G_2 T_2 (1-r_E)}\right]}{\sqrt{1+2(G_2-1)+2G_2 T_2(1-r_E)(G_1-1)}} \right)\right\}, \quad (58)$$

where $$\mathrm{erf}(x) = \frac{2}{\sqrt{\pi}} \int_0^x e^{-t^2}\, dt. \quad (59)$$

7.4 Eve's Information

This section estimates Eve's 5 information (i.e., the mutual information between the eavesdropper 5 and the sending unit 1) about the raw key (per 1 bit) after post-selection, but before the error correction stage:

$$I(A,E) = H(A) - H_{\hat{\rho}^f_{AE}}(A|E) = 1 - H_{\hat{\rho}^f_{AE}}(A|E). \quad (60)$$

The conditional entropy $H_{\hat{\rho}^f_{AE}}(A|E)$ is determined by the final density matrix of the AE-system, which is given in Eq. (52) and, employing the fact that $$p_\alpha(0|0) + p_\alpha(1|0) = p_{-\alpha}(0|1) + p_{-\alpha}(1|1), \quad (61)$$

can be written as $$\hat{\rho}^f_{AE} = tr_B \hat{\rho}^f_{ABE} = \int d^2\alpha Q_{\sqrt{\cdot}}[\alpha] \hat{\rho}^f_{AE}[\alpha] \quad (62)$$

with $$\hat{\rho}^f_{AE}[\alpha] = \frac{1}{2}|0\rangle\langle 0|_A \otimes |\sqrt{r_E}\,\alpha\rangle\langle\sqrt{r_E}\,\alpha|_E + \frac{1}{2}|1\rangle\langle 1|_A \otimes |-\sqrt{r_E}\,\alpha\rangle\langle -\sqrt{r_E}\,\alpha|_E, \quad (63)$$

$$Q_{\sqrt{\cdot}}[\alpha] = \frac{[p_\alpha(0|0) + p_\alpha(1|0)] P_{\sqrt{T_1}\gamma,G_1}(\alpha)}{p(\sqrt{\cdot})}.$$

To find a lower bound of Eve's 5 entropy (and therefore estimate the maximum of her information about the key), disclosure considers a situation where Eve 5 has some auxiliary register of variables $\alpha$ ($R_E$) and introduce the joint AE $R_E$ state:

$$\hat{\rho}^f_{AER_E} = \tfrac{1}{2} \int d^2\alpha Q_{\sqrt{\cdot}}[\alpha] \Sigma_{a=0,1} |a\rangle \langle a|_A \otimes |(-1)^a \sqrt{r_E}\,\alpha\rangle \langle (-1)^a \sqrt{r_E}\,\alpha|_E \otimes |reg(\alpha)\rangle \langle reg(\alpha)|R_E. \quad (64)$$

Here the register states satisfy $\mu reg(\alpha)|reg(\alpha')\rangle = \delta^{(2)}(\alpha-\alpha')$. The note is that first, by tracing out the register the procedure recovers the original state of AE-system $$tr_{R_E} \hat{\rho}^f_{AER_E} = \hat{\rho}^f_{AE}, \quad (65)$$

and second, the monotonicity of conditional entropy implies $$H_{\rho_{AE}^f}(A|E) \geq H_{\rho_{AER_E}^f}(A|ER_E) = H(\rho_{AER_E}^f) - H(\rho_{ER_E}^f), \quad (66)$$

which simply states that after discarding the register, Eve 5 can only lose information about the sent bit. To this end, by finding $$H_{\rho_{AER_E}^f}(A|ER_E)$$

we can obtain a lower bound on $$H_{\rho_{AE}^f}(A|E).$$

The matrix $\rho_{AER_E}^f$ can be rewritten as $$\rho_{AER_E}^f = \Sigma_i \int d^2\alpha Q_{\sqrt{}}[\alpha]\lambda_i^{(\alpha)}|\psi_i^{(\alpha)}\rangle\langle |$$
$$\psi_i^{(\alpha)}|\otimes|reg(\alpha)\rangle\langle |reg(\alpha)|_R, \quad (67)$$

where $\lambda_i^{(\alpha)}$ and $|\psi_i^{(\alpha)}\rangle$ are the eigenvalues and eigenstates of $\rho_{AE}^f[\alpha]$. We thus obtain $$H(\rho_{AER_E}^f) = -\sum_i \int d^2\alpha Q_{\sqrt{}}[\alpha]\lambda_i^{(\alpha)}\log\left(Q_{\sqrt{}}[\alpha]\lambda_i^{(\alpha)}\right) + C \quad (68)$$

$$= -\sum_i \int d^2\alpha Q_{\sqrt{}}[\alpha]\lambda_i^{(\alpha)}\left(\log\left(Q_{\sqrt{}}[\alpha]\right) + \log(\lambda_i^{(\alpha)})\right) + C$$

$$= -\int d^2\alpha Q_{\sqrt{}}[\alpha]\log\left(Q_{\sqrt{}}[\alpha]\right) - \int d^2\alpha Q_{\sqrt{}}[\alpha]\sum_i \lambda_i^{(\alpha)}\log(\lambda_i^{(\alpha)}) + C$$

$$= -\int d^2\alpha Q_{\sqrt{}}-[\alpha]\log\left(Q_{\sqrt{}}-[\alpha]\right) + \int d^2\alpha Q_{\sqrt{}}-[\alpha]H(\rho_{AE}^f[\alpha]) + C,$$

where C is an additional correcting term, which we will not need to calculate explicitly. In the same way we obtain $$H(\rho_{ER}^f) = \int d^2\alpha Q_{\sqrt{}}[\alpha]\log(Q_{\sqrt{}}[\alpha]) + \int d^2\alpha Q_{\sqrt{}}[\alpha]H(\rho_E^f[\alpha]) + C. \quad (69)$$

Combining the two expressions, we obtain $$H_{\rho_{AE}^f}(A|E) \geq H_{\rho_{AER_E}^f}(A|ER_E) = H(\rho_{AER_E}^f) - H(\rho_{ER_E}^f) \quad (70)$$

$$= \int d^2\alpha Q_{\sqrt{}}[\alpha]H(\rho_{AE}^f[\alpha]) - \left(H(\rho_E^f[\alpha])\right)$$

$$= \int d^2\alpha Q_{\sqrt{}}[\alpha]H_{\rho_{AE}^f[\alpha]}(A|E)$$

$$= 1 - \int d^2\alpha Q_{\sqrt{}}[\alpha]h\left(\frac{1 - |\langle\sqrt{r_E}\alpha|-\sqrt{r_E}\alpha\rangle|}{2}\right)$$

$$= 1 - \int d^2\alpha Q_{\sqrt{}}[\alpha]h\left(\frac{1 + e^{-2r_E|\alpha|^2}}{2}\right),$$

where $h(p) = -p\log(p) - (1-p)\log(1-p)$ is the binary entropy. We now can use Jensen's inequality $$\langle h(x)\rangle \leq h(\langle x\rangle) \rightarrow 1 - \langle h(x)\rangle \geq 1 - h(\langle x\rangle), \quad (71)$$

where $\langle x\rangle \equiv \int d^2\alpha Q_{\sqrt{}}[\alpha] x$:

$$H_{\rho_{AE}^f}(A|E) \geq 1 - h\left(\frac{1 + \langle e^{-2r_E|\alpha|^2}\rangle}{2}\right) \quad (72)$$

where $$\langle e^{-2r_E|\alpha|^2}\rangle = \int d^2\alpha Q_{\sqrt{}}[\alpha]e^{-2r_E|\alpha|^2},$$

We find $$\langle e^{-2r_E|\alpha|^2}\rangle = \frac{e^{\frac{2r_E G_1 T_1|\gamma|^2}{1+2r_E\epsilon_1}}}{p(\sqrt{})[1+2r_E\epsilon_1]} \quad (73)$$

$$\left\{1 - \frac{1}{2}\mathrm{erf}\left(\frac{\sqrt{2(1+2r_E\epsilon_1)}\left[\Theta - \frac{\sqrt{(1-r_E)G_2T_2G_1T_1}\,\gamma}{1+2r_E\epsilon_1}\right]}{\sqrt{2\epsilon_2 + 1 + 2(1-r_E)G_2T_2\epsilon_1 + 2r_E(2\epsilon_2+1)\epsilon_1}}\right)\right.$$

$$\left. - \frac{1}{2}\mathrm{erf}\left(\frac{\sqrt{2(1+2r_E\epsilon_1)}\left[\Theta + \frac{\sqrt{(1-r_E)G_2T_2G_1T_1}\,\gamma}{1+2r_E\epsilon_1}\right]}{\sqrt{2\epsilon_2 + 1 + 2(1-r_E)G_2T_2\epsilon_1 + 2r_E(2\epsilon_2+1)\epsilon_1}}\right)\right\},$$

where $\epsilon_{1,2} \equiv G_{1,2} - 1$.

By substituting Eq. (73) into Eq. (72) and using Eq. (60) the method described in this section obtains an upper bound on Eve's 5 information.

7.5 Bob's Error Rate

This section estimates Bob's 2 error rate. Bob's 2 information (i.e., the mutual information between the sending unit 1 and the receiving unit 2) per 1 bit about the key after post-selection but before error correction is given by $$I(A,B) = H(A) - H_{\hat{\rho}_{AB}^f}(A|B) = 1 - H_{\hat{\rho}_{AB}^f}(A|B) \quad (74)$$

and should ideally be equal to 1. Bob's 2 error rate is therefore determined by the conditional entropy $H_{\hat{\rho}_{AB}^f}(A|B)$:

$$H_{\hat{\rho}_{AB}^f}(A|B) = H(\hat{\rho}_{AB}^f) - H(\hat{\rho}_B^f). \quad (75)$$

It follows from Eq. (52) that $$H(\hat{\rho}_{AB}^f) = -\Sigma_{a,p=0,1}\frac{p(b|a)}{2p(\sqrt{})}\log\left(\frac{p(b|a)}{2p(\sqrt{})}\right), \quad (76)$$

$$H(\hat{\rho}_B^f) = \quad (77)$$
$$-\Sigma_{b=0,1}\frac{p(b|a=0) + p(b|a=1)}{2p(\sqrt{})}\log\left(\frac{p(b|a=0) + p(b|a=1)}{2p(\sqrt{})}\right),$$

and the probabilities p(b|a) and p($\sqrt{}$) are given by Eqs. (55) to (58) and (51). Note that post-selection is symmetric, $$p(0|0) + p(1|0) = p(0|1) + p(1|1) = p(\sqrt{}) \quad (78)$$

Then $$H_{\hat{\rho}_{AB}^f}(A|B) = h\left(\frac{p(0|0)}{p(\sqrt{})}\right), \quad (79)$$

where $$h(p) = -p\log(p) - (1-p)\log(1-p) \quad (80)$$

is again the binary entropy.

After the error correction procedure, Bob's 2 information about the key becomes $\tilde{I}(A, B)=1$, but Eve's 5 information increases, and one can estimate it as $$\tilde{I}(A,E) = I(A,E) + H_{\rho_{AB}}^f(A|B) \leq 1 - \min H_{\rho_{AE}}^f(A|E) + H_{\rho_{AB}}^f(A|B). \tag{81}$$

8 Key Rate

This section estimates the length $L_f$ of the final key after post-selection, error correction and privacy amplification:

$$L_f = p(\sqrt{}) L \cdot (1 - \tilde{I}(A,E)) = p(\sqrt{}) L \cdot (\min H_{\rho_{AE}}^f(A|E) - H_{\rho_{AB}}^f(A|B)). \tag{82}$$

Equation (82) determines the final key generation rate and represents the main result of the information theory model. This equation in its explicit form, which is too cumbersome to be spelled out here, includes two parameters—the amplitude of the signal $\gamma$ and the measurement parameter $\Theta$—which Alice 1 and Bob 2 can vary depending on $r_E$ to ensure the best rate (e.g., by numerically maximizing the function in Eq. (82)). Furthermore, as we recall from Sec. 7.1, Eq. (82) also includes the distance d between two neighboring amplifiers 4 and the distances $D_{AB}$ and $D_{AE}$ between the participants of the action—these are parameters which we consider fixed.

Eq. (82) also depends on the number of spatially separated amplifiers M and the amplification factor G of the spatially separated amplifiers 4. Those parameters thus constitute input parameters to the information theory model.

Figure 6:
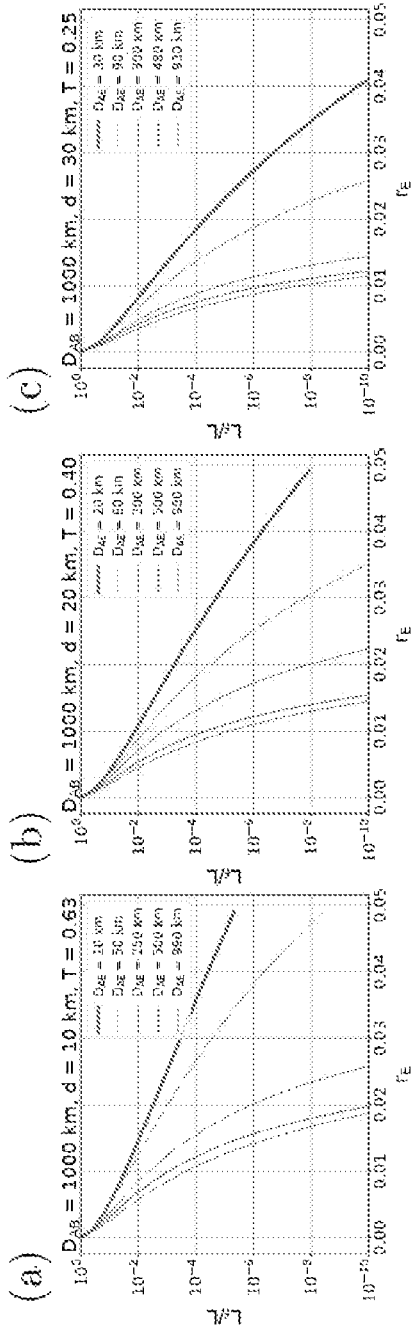
FIG. 6 shows results for the achieved cryptographic key rate for different values of spatial distance between amplifiers in a communication setup according to an embodiment of the present disclosure.

FIG. 6 plots $L_f/L$ as function of $r_E$ for different values of distance d between two neighbouring amplifiers 4, namely (a) d=10 km, (b) d=20 km, and (c) d=30 km. The distance between Alice 1 and Bob 2 is assumed fixed, $D_{AB}$=1,000 km. The different curves plotted in FIG. 6 correspond to varying distances DAE between Alice 1 and Eve 5, from the smallest distance (top curve) to the largest distance (bottom curve). For every value of $r_E$ the parameters $\gamma$ and $\Theta$ are such that they maximize $L_f/L$. Since there are correlations imposed by the amplifiers, for Eve 5 it is beneficial to intercept the signal near Bob 2. A secure and fast communication can be established if $L_f/L \geq 10^{-6}$, thus Alice 1 and Bob 2 can allow Eve 5 to steal no more than a few percent.

Figure 7:
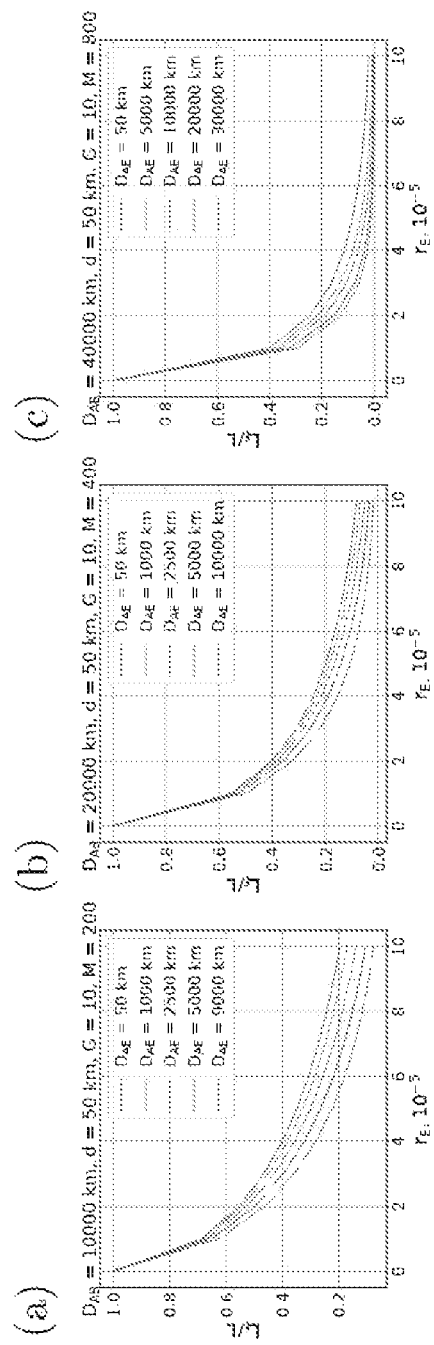
FIG. 7 shows results for the achieved cryptographic key rate for different values of spatial distance between Alice and Bob in a communication setup according to an embodiment of the present disclosure.

Similarly, FIG. 7 shows $L_f/L$ as function of $r_E$ for different values of distance $D_{AB}$ between Alice 1 and Bob 2, namely (α) DAB=10,000 km, (b) DAB=20,000 km, and (c) DAB=40,000, under the assumption that we can technically measure $r_E$ with the theoretically allowed precision discussed in Sec. 3. The different curves plotted in FIG. 7 again correspond to varying distances DAE between Alice 1 and Eve 5, from the smallest distance (top curve) to the largest distance (bottom curve). The distance between neighboring amplifiers 4 is assumed fixed, d=50 km. The amplitude of the signal $\gamma$ varies from $10^4$ for $r_E$=0.0 to $10^2$ for $r_E \sim 10^{-5}$.

Figure 8:
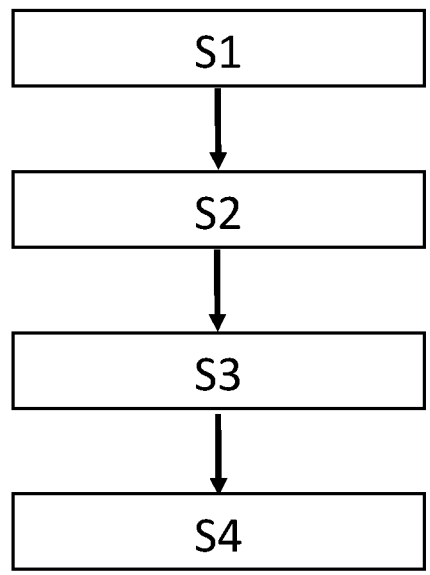
FIG. 8 shows a schematic flow diagram of method steps according to an embodiment of the present disclosure.

FIG. 8 shows a schematic flow diagram of steps S1 to S4 of the proposed method according to an embodiment.

In step S1, an electromagnetic test pulse is transmitted from the sending unit 1 to the receiving unit 2 via the communication channel 3.

In step S2, the signal loss $r_E$ in the communication channel 3 caused by an eavesdropper 5 is determined based on the electromagnetic test pulse detected at the receiving unit 2.

In step S3, the ciphering parameter of the ciphering protocol, i.e., the coherent state amplitude $\gamma$, and the minimal absolute value $\Theta$ (measurement parameter) are determined by maximizing the expected key generation rate $L_f/L$ based on Eq. (82) with respect to the ciphering parameter and the minimal absolute value $\Theta$ using the information theory model for the expected key generation rate $L_f/L$. The determined signal loss $r_E$ and the amplification parameters of the spatially separated amplifiers 4, i.e., the number of spatially separated amplifiers M, the amplification factor G, the distance d between two neighboring amplifiers 4 and the distances $D_{AB}$ and $D_{AE}$, are taken into account as input parameters to the information theory model in Eq. (82).

In step S4, the first sequence of electromagnetic pulses 6 is transmitted from the sending unit 1 to the receiving unit 2 via the communication channel 3 through the spatially separated amplifiers 4, for establishing a shared secret cryptographic key, wherein each transmitted electromagnetic pulse of the first sequence of electromagnetic pulses 6 corresponds to a bit of the random bit sequence according to the ciphering protocol.

Figure 9:
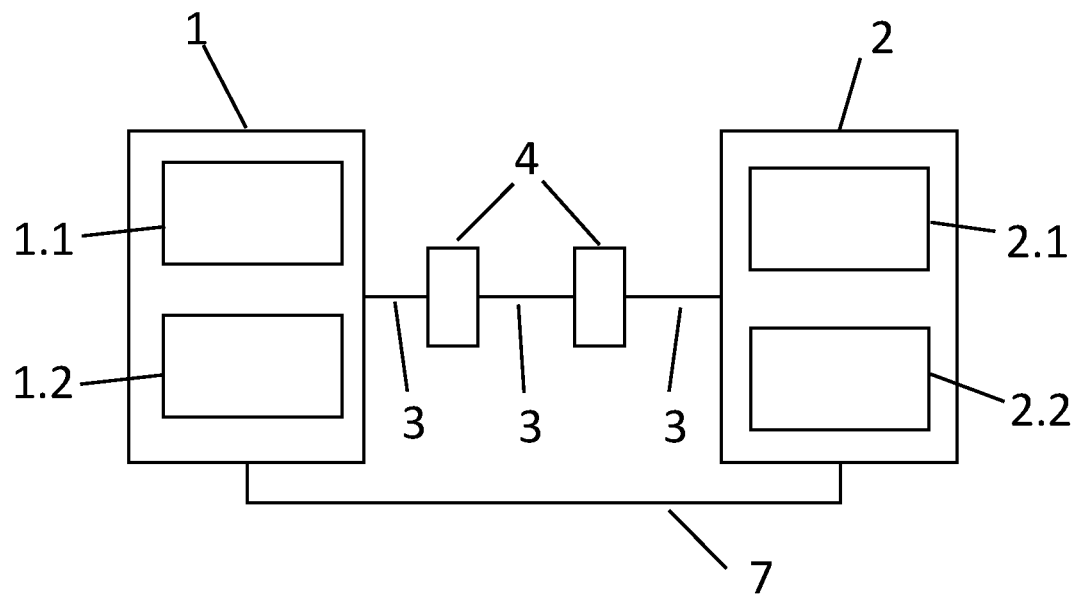
FIG. 9 is a schematic illustration of a communication apparatus according to an embodiment of the present disclosure.

FIG. 9 is a schematic illustration of a communication apparatus configured to carry out the steps of the proposed method, according to an embodiment.

The communication apparatus depicted in FIG. 9 comprises the sending unit 1, the receiving unit 2, the communication channel 3, the plurality of spatially separated amplifiers 4, and the authenticated public classical channel 7. The sending unit 1 comprises an electronic evaluation and control unit 1.1 and an electromagnetic radiation source 1.2. The receiving unit 2 comprises an electronic evaluation and control unit 2.1. and a detector and measurement unit 2.2.

The electronic evaluation and control unit 1.1 of the sending unit 1 comprises a classical random number generator (not shown) configured to generate the random bit sequence. The electronic evaluation and control unit 1.1 is further configured to determine the ciphering parameter of the ciphering protocol and the minimal absolute value $\Theta$ (measurement parameter) by maximizing the expected key generation rate $L_f/L$ based on Eq. (82).

The electromagnetic radiation source 1.2 of the sending unit 1 is configured to generate the first sequence of electromagnetic pulses 6 and the electromagnetic test pulse according to the ciphering protocol. The electromagnetic radiation source 1.2 of the sending unit 1 is further configured to transmit the first sequence of electromagnetic pulses 6 and the electromagnetic test pulse to the receiving unit 2.

The detector and measurement unit 2.2 of the receiving unit 2 is configured to detect and measure at least the phases of the transmitted and received first sequence of electromagnetic pulses 6 and the intensity of the transmitted and received electromagnetic test pulse.

The electronic evaluation and control unit 2.1 of the receiving unit 2 is configured to determine the signal loss $r_E$ in the communication channel 3 caused by an eavesdropper 5 based on the electromagnetic test pulse detected at the receiving unit 2.

The communication channel 3 comprises a plurality of transmission lines. The spatially separated amplifiers 4 are integrated (in-line) into the communication channel 3. The authenticated public classical channel 7 is configured to transmit feedback information from the receiving unit 2 to the sending unit 1 and vice versa for performing post-selection, error-correction and privacy-amplification.

9 Estimates

The following provides simple and transparent numeric estimates for photon numbers and fluctuations of the electromagnetic pulses illustrating the proposed method. An exemplary case estimates the strength of the electromagnetic pulses that allows for their stable transmitting and amplifying without distorting its shape and phase with the minimal generated noise and, at the same time, preserving the degree of protection against eavesdropping.

More specifically, the method considers a representative transmission line of 20,000 km in length. In general, the exact optimal distance between amplifiers 4 is determined, e.g., through calculations. Here, as an illustration the method considers the standard telecom distance d=50 km. On this distance, the signal may drop by a factor of 10 (transmission probability T=0.1). Correspondingly, the amplifying coefficient is G=10. In case the initial test signal carries $n_T^A=10^{14}$ photons, the number of photons drops down to $Tn_T^A=10^{13}$ after 50 km. An amplifier restores it back to $GTn_T^A=10^{14}$ photons but adds noise. Since photons follow Poisson statistics, the fluctuations before amplification are $\sqrt{Tn_T^A}\approx 3 \cdot 10^6$. These fluctuations are amplified by the factor G, as well, yielding $$\delta n_T^G = G\sqrt{Tn_T^A} \approx 3 \cdot 10^7. \quad (83)$$

Transmitting through the sequence of M amplifiers 4, which add fluctuations independently, the total fluctuations are raised by a factor of $\sqrt{M}$, yielding a twenty-fold fluctuation increase for M=400 amplifiers 4 on the 20,000 km line. The fluctuations on Bob's 2 end are thus $$\delta n_T^B = \sqrt{M}\delta n_T^G \approx 6 \cdot 10^8. \quad (84)$$

Finally, the method yields the minimum detectable leakage $$r_E^{min} = \delta n_T^B / n_T^B \approx 6 \cdot 10^{-6}. \quad (85)$$

In an exemplary embodiment, intensity ciphering is considered instead of phase ciphering. If Eve 5 seizes a part of the signal comprising about ~1 photon (seizing the signal in the vicinity of Alice 1), the corresponding relative error of order unity would make it impossible for Eve 5 to distinguish between the different electromagnetic pulses transmitted by Alice 1, provided that their intensities are of similar order of magnitude.

A pulse hard for eavesdropping thus preferably comprises $n\sim 1/r_E^{min}\approx 1.7 \cdot 10^5$ photons. In this case, the fluctuations at Bob 2 amount to $$\delta n = \sqrt{GMn} \approx \sqrt{104001.7 \cdot 10^5} \approx 2.6 \cdot 10^4 \quad (86)$$

and $$\delta n/n \approx 0.15. \quad (87)$$

Therefore, especially taking into account the additional post-processing measures exercised by both Bob 2 and Alice 1 as explained further above, a transmission from Alice 1 to Bob 2 cannot be intercepted efficiently by Eve 5. The fact that scalability behaves as square root of the line length, enables to safely transmit a decipherable signal over a global distance of 40,000 km.

The description of the embodiments and figures merely serve to illustrate the techniques of the present disclosure and the advantages that they achieve, but should not be understood to imply any limitation. The scope of the disclosure is to be determined based on the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for determining a secret cryptographic key shared between a sending unit and a receiving unit that are connected via a communication channel comprising a plurality of spatially separated amplifiers, the method comprising: transmitting, at the sending unit, at least one electromagnetic test pulse to the receiving unit via the communication channel, and determining a signal loss ($r_E$) in the communication channel caused by an eavesdropper based on the at least one electromagnetic test pulse detected at the receiving unit; transmitting, at the sending unit, a first sequence of electromagnetic pulses to the receiving unit via the communication channel for establishing a shared secret cryptographic key, wherein the transmitted first sequence of electromagnetic pulses along the communication channel are amplified by the spatially separated amplifiers; wherein each electromagnetic pulse of the first sequence of electromagnetic pulses corresponds to a bit of a random bit sequence according to a ciphering protocol; and determining at least one ciphering parameter of the ciphering protocol by maximizing an expected key generation rate (Lf/L) with respect to the at least one ciphering parameter using an information theory model for the expected key generation rate (Lf/L), wherein the determined signal loss ($r_E$) and at least one amplification parameter of the spatially separated amplifiers are taken into account as input parameters to the information theory model.

2. The method according to claim 1, wherein the electromagnetic pulses of the first sequence of electromagnetic pulses are coherent electromagnetic pulses with a same pulse intensity, and/or a ciphering mode of the ciphering protocol is phase ciphering or intensity ciphering, and/or the at least one ciphering parameter corresponds to an absolute value ($\gamma$) of a coherent state amplitude of the coherent electromagnetic pulses of the first sequence.

3. The method according to claim 1, wherein the at least one amplification parameter of the spatially separated amplifiers comprises a number of spatially separated amplifiers (M), and/or a distance (d) between two neighboring amplifiers, and/or an amplification factor (G) of the spatially separated amplifiers.

4. The method according to claim 1, wherein the information theory model for the expected key generation rate further takes into account a distance ($D_{AB}$) between the sending unit and the receiving unit, and/or a distance ($D_{AE}$) between the sending unit and the eavesdropper, and/or an intrinsic loss of the communication channel.

5. The method according to claim 1, wherein the method further comprises: performing a post-selection, in particular using homodyne detection or intensity detection, of the transmitted first sequence of electromagnetic pulses at the receiving unit, wherein bits corresponding to detected electromagnetic pulses with a quadrature component (q) not exceeding a minimal absolute value ($\Theta$) are discarded as inconclusive.

6. The method according to claim 5, wherein the minimal absolute value ($\Theta$) of the quadrature component is determined by maximizing the expected key generation rate ($L_f/L$) with respect to the at least one ciphering parameter, and/or with respect to a measurement parameter corresponding to the quadrature component (q) of a detected electromagnetic pulse.

7. The method according to claim 1, wherein the method further comprises: estimating an error rate of deciphering at the receiving unit, in particular based on homodyne detection results, for at least a part of the transmitted first sequence of electromagnetic pulses, and/or performing an error correction, wherein a block size of the error correction code is determined based on the estimated error rate of deciphering.

8. The method according to claim 7, characterized in that the error correction code comprises a low-density parity-check code (LDPC).

9. The method according to claim 7, wherein the error correction is performed adaptively, wherein subsets of the sequence of detected electromagnetic pulses become error corrected iteratively, and/or wherein an estimate of the error rate of deciphering is updated successively when a new subset becomes error corrected, and/or wherein the error correction code used in each iteration is adapted accordingly.

10. The method according to claim 1, wherein the method further comprises: performing privacy amplification, in particular using a hash function, in order to eliminate or limit information obtainable by the eavesdropper.

11. The method according to claim 1, wherein the spatially separated amplifiers comprise coherence-preserving optical amplifiers and/or in-line Erbium doped fiber amplifiers (EDFA).

12. The method according to claim 1, wherein the information theory model for estimating the key generation rate ($L_f/L$) takes into account a microscopic evolution of a density matrix corresponding to a state of an electromagnetic pulse transmitted from the sending unit along the communication channel to the receiving unit in the presence of loss and/or amplification, and/or post-selection and/or error correction.

13. A communication apparatus configured to determine a secret cryptographic key shared between a sending unit and a receiving unit that are connected via a communication channel comprising a plurality of spatially separated amplifiers, the apparatus comprising:
the sending unit,
the receiving unit, and
the communication channel comprising the spatially separated amplifiers,
wherein the sending unit is configured to transmit at least one electromagnetic test pulse to the receiving unit via the communication channel, and determine a signal loss ($r_E$) in the communication channel caused by an eavesdropper based on the at least one electromagnetic test pulse detected at the receiving unit;
wherein the sending unit is further configured to transmit a first sequence of electromagnetic pulses to the receiving unit via the communication channel for establishing a shared secret cryptographic key, wherein the transmitted first sequence of electromagnetic pulses along the communication channel is amplified by the spatially separated amplifiers;
wherein each electromagnetic pulse of the first sequence of electromagnetic pulses corresponds to a bit of a random bit sequence according to a ciphering protocol; and
determining at a controller at least one ciphering parameter of the ciphering protocol by maximizing an expected key generation rate ($L_f/L$) with respect to the at least one ciphering parameter using an information theory model for the expected key generation rate ($L_f/L$),
wherein the determined signal loss ($r_E$) and at least one amplification parameter of the spatially separated amplifiers are taken into account as input parameters to the information theory model.

14. A computer readable storage medium comprising instructions which, when executed by a computer, cause the computer to carry out the method according to claim 1.

15. A computer program product comprising instructions which, when executed by a computer, cause the computer to carry out the method according to claim 1.

* * * * *